United States Patent [19]

Yasuda et al.

[11] Patent Number: 5,121,898
[45] Date of Patent: Jun. 16, 1992

[54] METHOD OF CONTROLLING POSITIONS AND VIBRATIONS AND ACTIVE VIBRATION CONTROL APPARATUS THEREFOR

[75] Inventors: Masashi Yasuda; Fumiaki Itojima, both of Hyogo, Japan

[73] Assignee: Tokkyo Kiki Kabushiki Kaisha, Hyogo, Japan

[21] Appl. No.: 556,483

[22] Filed: Jul. 24, 1990

[30] Foreign Application Priority Data

| Jul. 24, 1989 | [JP] | Japan | 1-192106 |
| Jul. 24, 1989 | [JP] | Japan | 1-192107 |
| Jul. 24, 1989 | [JP] | Japan | 1-192108 |
| Apr. 11, 1990 | [JP] | Japan | 2-97482 |
| May 25, 1990 | [JP] | Japan | 2-136252 |
| May 28, 1990 | [JP] | Japan | 2-137968 |

[51] Int. Cl.⁵ ............................. F16M 13/00
[52] U.S. Cl. ..................... 248/550; 73/649; 248/583; 248/638
[58] Field of Search .......... 248/550, 638, 583, 631; 73/649, 658

[56] References Cited

U.S. PATENT DOCUMENTS

| 4,336,917 | 6/1982 | Phillips | 248/550 |
| 4,744,539 | 5/1988 | Stimeling | 248/638 |
| 4,802,648 | 2/1989 | Decker et al. | 248/638 X |
| 4,821,205 | 4/1989 | Schutten et al. | 248/550 X |
| 5,011,108 | 4/1991 | Chen et al. | 248/638 X |
| 5,022,628 | 6/1991 | Johnson et al. | 248/638 |

FOREIGN PATENT DOCUMENTS 2804865 8/1978 Fed. Rep. of Germany ...... 248/550

Primary Examiner—David L. Talbott
Attorney, Agent, or Firm—Edwin E. Greigg

[57] ABSTRACT

A method of controlling level lateral positions of a vibration control base suspended by air springs to be returned to its standard level and lateral positions and to keep their positions by utilizing analog integration or a feedback compensation in combination thereto so as to control an air pressure or air pressures of air springs for driving the vibration control base and also controlling vertical and horizontal vibrations of the vibration control base and an apparatus for carrying out the said method.

19 Claims, 20 Drawing Sheets

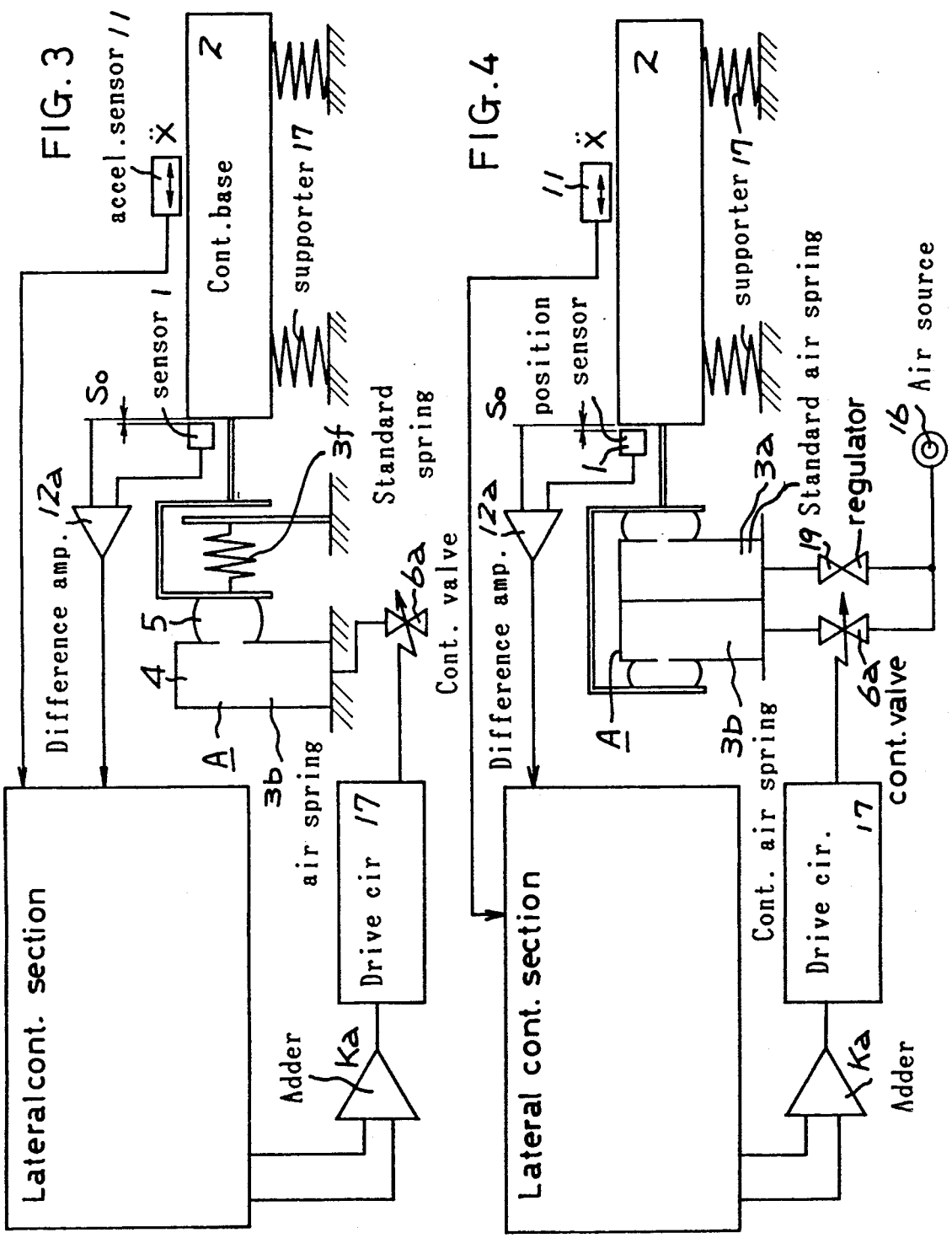

METHOD OF CONTROLLING POSITIONS AND VIBRATIONS AND ACTIVE VIBRATION CONTROL APPARATUS THEREFOR

BACKGROUND OF THE INVENTION

1. Field of the Invention

The present invention relates to a method of controlling positions and vibrations and an active vibration control apparatus therefor for carrying out a precise vibration control for any kind of precision machines and precision instruments such as a holographic instrument, an electron microscope, apparatus for producing semiconductors, a laser measuring machine, a super precision measuring machine and so sorth.

2. Description of the Prior Art

A floor receives any kind of vibrations such as strong and weak vibrations, horizontal and vertical vibrations and any range of frequencies of vibrations from high frequency to low frequency. Therefore, these vibrations are propagated to a precision machine or instrument which is mounted on the floor.

For instance where a measuring instrument mounted on the floor provides driving means and when a work piece to be measured by the instrument is moved, vibrations occur and inclination of the instrument may sometimes be occurred.

In the case that the instrument or the machine is an ordinary machine tool, it is not necessary to consider influence of such vibrations propagated to the machine. However, in the case that the instrument or machine is such as a jig boring machine, a super precision machine tool an apparatus for producing a super LSI, or a laser measuring machine, such vibrations give a fatal influence to those instruments.

Accordingly, vibration control becomes a very important element in keeping a high recision for the super precision machine. Since the vibrations propagated to the super precision machine on the floor involve many kinds of frequencies and sometimes the machine resonates according to a certain frequency, and an ordinary spring cannot control such vibrations.

Therefore, instead of the conventional idea of the vibration control system, it is introduced an active vibration control system which converts the vibrations propagated from the floor into electronic signals so as to control a vibration control base by means of an active vibration control apparatus.

For example, Japanese Patent Application No. 63-35829, discloses a vibration control apparatus for controlling vibrations and maintaining a level of a vibration control base by means of a digital control system, which is shown in FIG. 28.

The apparatus provides a digital level control circuit 100 for controlling a level. The digital control circuit detects a value of level displacement of a vibration control base 131 by means of a level sensor 120 and the output of the level sensor 120 is compared with a standard level voltage by means of a comparator 132 and the difference obtained thereby is input to a pulse generator 121 so that the generator generates analog signals in accordance with the value of the displacement and then inputs the analog signals into a displacement pulse generator 121. Constant pulses are generated by the displacement pulse generator 121 in synchronism with a clock 122, which is provided therewith, during the period of generation of the analog signals and the constant pulses are input to an adder 123. The adder 123 counts the input signals and then outputs same as the displacement signals and thereby the value of level displacement may be sized digitally.

Next, vertical micro-vibrations may be controlled by means of a digital vibration control circuit 101. Micro-vibrations of a vibration control base 131 propagated from a floor or vibrations of a precision instrument on the base, are detected by a vibration sensor 124 and vibration signals from the vibration sensor 124 are input to an arithmetic circuit 125 via a lowpass filter 133. The phases of the detected signals output from the arithmetic circuit 125 are inverted at 180° by means of a phase inverter 126. The signals inverted by the phase inverter 126 are input to a level displacement and micro-vibration adder 127 after they are changed to analog signals. By means of the level displacement and micro-vibration adder 127, the phase inverting signals are added to the level displacement signals output from the adder 123 of the level control circuit 100 and disturbance control is carried out together with a levelling correction. The outputs from the level displacement and micro-vibration adder 127 are input to a drive circuit 128 so as to control a control valve 129 in order to control a pressure of an air spring 132. An compression air is supplied to the control valve 129 from an air pressure source 110 via a regulator 112 so as to control an air pressure of the air spring 132.

According to the digital level control circuit 100, the drive circuit 128 outputs a raising signal to the control valve 129 in order to lift up the vibration control base 131 by means of the air spring 132 when the vibration control base 131 goes down below a standard level H, and when the vibration control base 131 becomes positioned above the standard level H, a lowering signal is output.

While the raising signal is output, the output signals of the displacement pulse generator 121 are added by means of the adder 123 and subtracted thereby when the lowering signal is output. The added or subtracted signals are finally converted to analog signals via a D/A converter 130 and then output. The addition and subtraction is continued while the vibration control base 131 is not accorded with the standard level H.

Such a digital control system cannot, however, evade hunting (raising and lowering) of the vibration control base 131 around the standard level H since the raising and lowering signals are changed on the basis of a single point of the standard level. Therefore, it is required to add another means to the digital control system so as to stop counting of the adder 123 within a range which is limited at very short distances in up and down directions from the standard level. However, in such a manner, the vibration control base 131 is freely raised and lowered within the limited range so that a level error frequently occurs within the limited range. In other words, the digital control system includes a control precision of ±X % at the standard level H.

To minimize the error and increase the precision of levelling, it is necessary to use a D/A converter 130 having a great number of bits. However, such a converter increases a cost of the apparatus.

SUMMARY OF THE INVENTION

The present invention has an object to provide a method of controlling a level of a vibration control base precisely so as to be returned to and maintained at a predetermined level without hunting.

To achieve the object, the method of controlling a level according to the present invention comprises the steps of sensing a level of a vibration control base suspended by air springs to output a level voltage, comparing the level voltage with a standard level voltage to obtain and output a difference therebetween, integrating the difference to obtain an analog integrated value only or integrating the difference and giving a feedback compensation to the difference at the same time to obtain a compensated value for accelerating levelling of the vibration control base, outputting the analog integrated value only or a value obtained by adding the analog integrated value and the compensated value as a level control value, and controlling an air pressure of the air springs in accordance with the level control value.

Therefore, according to the method, the following advantages may be obtained.

(1) Comparing with the conventional digital vibration control system, there occurs no error range wherein the vibration control base becomes free in up and down directions around a standard (initial) level and so it becomes possible to stop and maintain the vibration control base at the standard (initial) level precisely.

(2) It becomes possible to simplify the levelling control circuit and to lower its cost in spite of grading up the precision of levelling control.

(3) There is little noise disturbance in comparison with the conventional digital control system.

(4) In addition to the analog integration, where the feedback compensation takes place, it becomes possible to accelarate levelling of the vibration control base by speeding up an integral action time.

(5) Further, where the vibration includes a frequency higher than a time constant of the air spring, a component of the difference differentiated by the feedback compensation, is input to the adder and so as to take place a feedback control. As the results, it becomes possible to control the displacement of the vibration control base in the up and down directions within a high frequency vibration.

(6) Further, where the vibrations include frequencies lower than a time constant of the air spring, a component of the difference differentiated by the feedback compensation, is input to the adder and so that a feedback control may take place. As the results, it becomes possible to control the displacement of the vibration control base in the up and down directions within a low frequency vibration.

(7) The vertical vibrations are memorized as predata and a feedfoward control may be carried out on the basis of the predata.

(8) In addition to the levelling control, it may carry out a feedback compensation with respect to vertical vibrations so that the vibration control base in the up and down directions may be controlled.

The second object of the present invention is to provide a method of controlling vibrations of a vibration control base in horizontal directions without influence of high and low frequencies of the horizontal or lateral vibrations.

To achieve the second object, the method of controlling vibrations comprises the steps of sensing a displacement of a vibration control base, which is suspended by air springs, in a horizontal direction with respect to a standard level position so as to output an analog level position voltage, comparing the analog level position voltage with a standard level position voltage to obtain and output a difference therebetween, integrating the difference to obtain an integrated value only or integrating the difference and giving a feedback compensation to the difference at the same time to obtain a compensated value for accelerating levelling control of the vibration control base, outputting the integrated value only or a value obtained by adding the integrated value and the compensated value as a level control value, sensing an acceleration of vibration of the vibration control base in a horizontal direction so as to output an accelaration voltage of horizontal directions, giving at least one of integration, differentiation and amplification to the accelaration voltage of horizontal direction or combining a phase compensation therewith to output a horizontal vibration control value so as to carry out a feedback compensation for vibrations in horizontal directions, and controlling an air pressure of the air springs in accordance with a level and vibration control value obtained by summing the level control value and the horizontal vibration control value.

Accordingly, it becomes possible to control vibrations in horizontal directions while maintaining the vibration control base at the standard level position so that vibrations may be controlled precisely. For instance, the method may be applied for an apparatus for producing semiconductors.

The third object of this invention is to provide an active vibration control apparatus for controlling any kind of vibrations propagated from a floor to a machine or apparatus set on a vibration control base which vibrations include high and low frequencies, strong and weak vibrations and vibrations in any directions.

To achieve the third object of this invention, the active vibration control apparatus comprises a fixed base, a vibration control base disposed above the fixed base, vertical supporters interposed between the fixed base and the vibration control base to support the vibration control and having flexibility in horizontal directions, vertical direction vibration control means interposed between the fixed base and the vibration control base via the vertical supporters, vertical direction control means for returning and maintaining a level of the vibration control base at a standard level position and for controlling vertical vibrations to drive the vertical direction vibration control means, horizontal direction vibration control means interposed between the fixed base and the vibration control base, and horizontal direction control means for returning and maintaining a lateral position of the vibration control base at a standard lateral position and for controlling horizontal vibrations to drive the horizontal direction vibration control means.

Therefore, according to the apparatus, the vertical direction vibration control means does not interfere with the horizontal direction control means almost since the vertical direction vibration control means is supported by the vertical supporters which are flexible in horizontal directions and as the result both of the vertical and horizontal direction means are unified in a sole apparatus.

Accordingly, it becomes possible to control vibrations including all of the directions, high and low frequencies and strong and weak vibrations by a sole apparatus. This does not mean that it is necessary to arrange the vertical direction vibration control means independently from the horizontal direction control means as in the above mentioned conventional art.

are contrary to the conventional art, the apparatus of this invention becomes compact and does not occupy to much space.

BRIEF DESCRIPTION OF THE DRAWINGS

The drawings show embodiments of an active vibration control apparatus and a method of controlling positions and vibrations according to the present invention in which:

FIG. 3 is a block diagram modifying the block diagram of FIG. 2, FIG. 4 is a block diagram used for a standard air spring instead of a metal spring in controlling a level.

DETAILED DESCRIPTION OF THE EMBODIMENTS

The embodiments of the present inventional will be described below in detail with reference to the drawings.

A vibration control base 2 is so constructed as to mount thereon precision instruments such as a holographic instrument, an electron microscope, apparatus for producing semiconductors. To support the vibration control base 2, four active vibration control devices A as well as an active vibration control circuit are provided.

Figure 8:
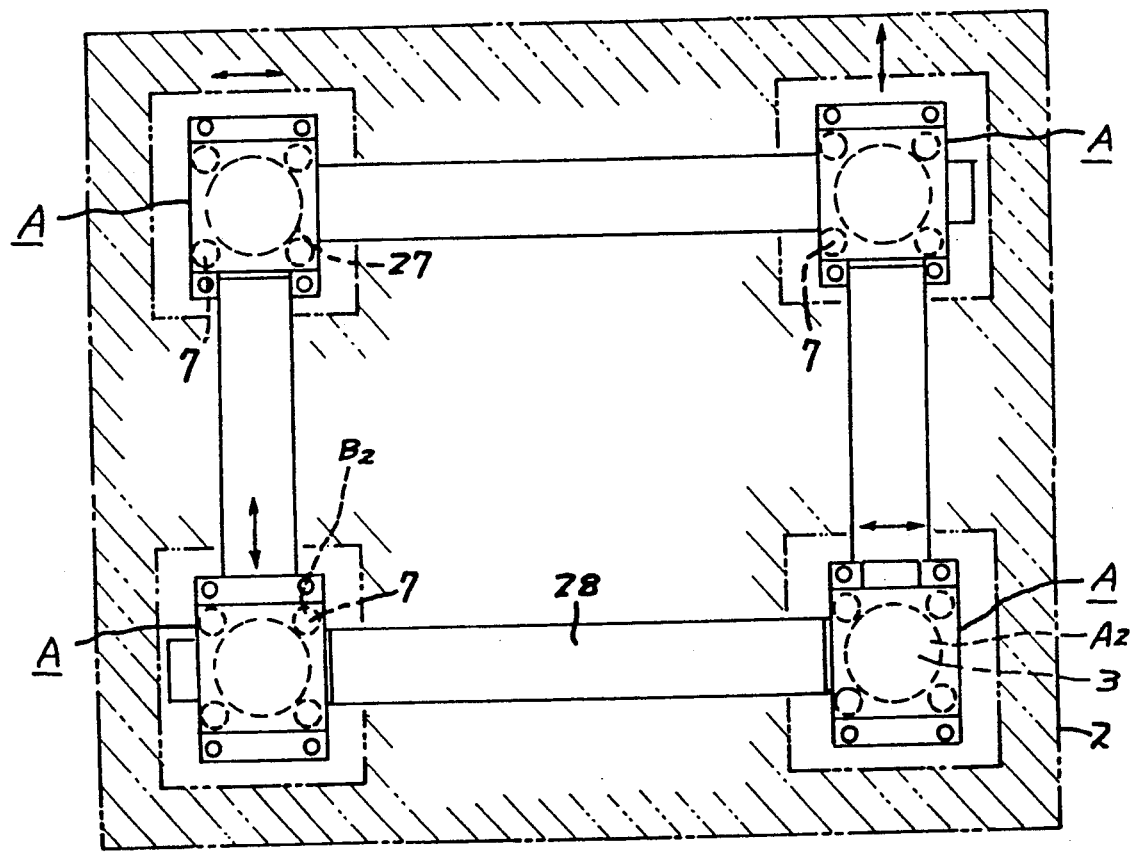
FIG. 8 is a plan view of the vibration control base.

The vibration control device A includes a vertical vibration control means and a horizontal vibration control means as a unit to form like a block. As shown in FIG. 8, where four vibration control devices A are used, they are arranged in such a manner that horizontal control directions of each of the vibration control devices A, which are adjacent to one another, are perpendicular to one another. Where there vibration control devices A are used, they are arranged to make the same horizontal control directions perpendicular to the center of gravity of the vibration control base and to hold an angle of 120° therebetween or arranged to have their directions toward the center of gravity and hold an angle of 120° therebetween.

Air springs, piezo-electric crystal, or linear motors may be provided with the vibration control devices A. In this embodiment, air springs 3 are used for the vertical vibration control means and the horizontal vibration control means of the vibration control device A. Further, laminated supporters 7 are used for vertical direction supporters B2 and wires 8 are used for horizontal direction supporters B1.

Figure 15:
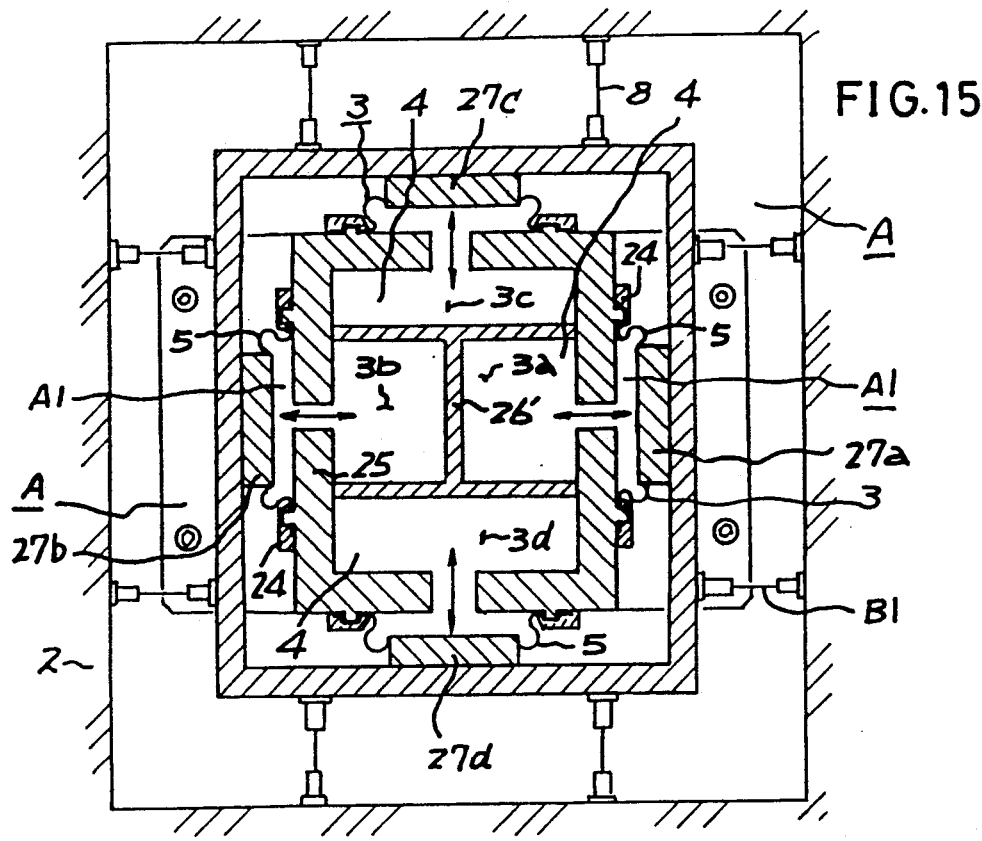
FIG. 15 is a cross sectional view of the vibration control apparatus of the fourth embodiment.
Figure 16:
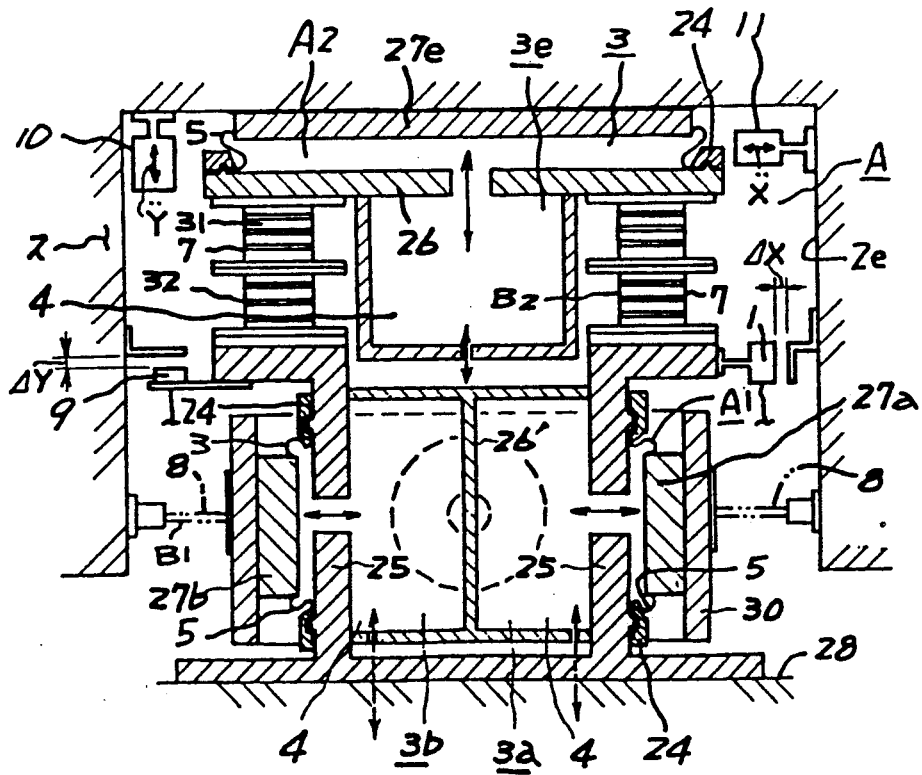
FIG. 16 is a sectional side view of the apparatus in FIG. 15.

In FIGS. 9 through 12, the apparatus are controlled in two directions, i.e. vertical and horizontal directions. As shown in FIGS. 15 and 16, the apparatus may of course be controlled in three directions, i.e. vertical and two horizontal directions.

Figure 9:
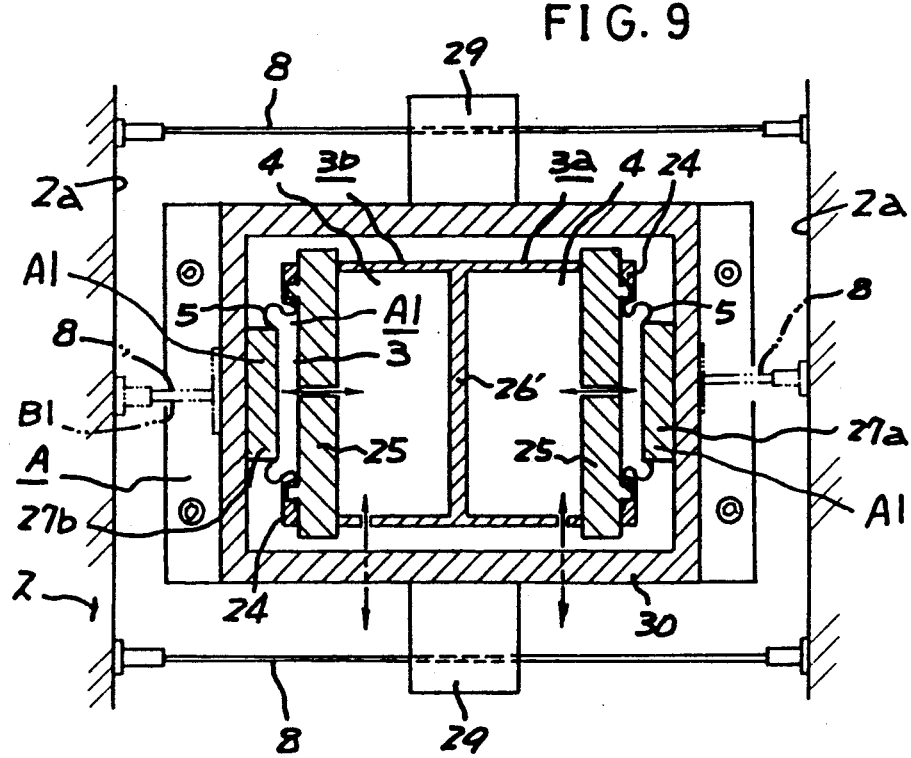
FIG. 9 is a cross sectional view of the apparatus of the first embodiment.
Figure 10:
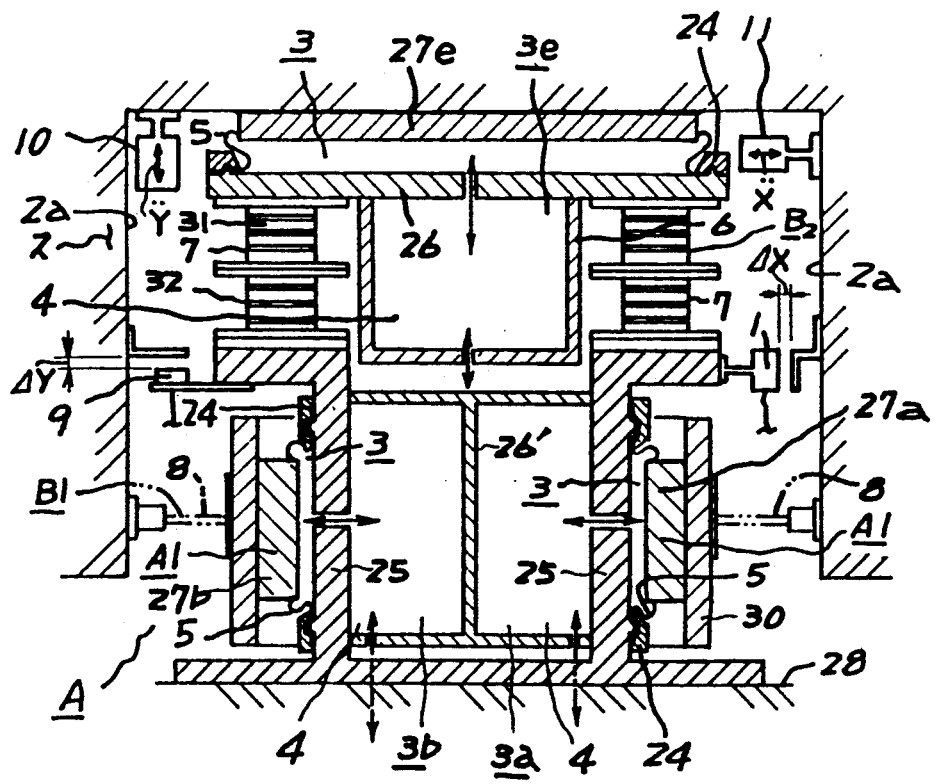
FIG. 10 is a sectional side view of the apparatus in FIG. 9.

Now, the embodiment will be described with reference to FIGS. 8 through 11. As shown in FIGS. 9 and 10, one of the four vibration control devices A is referred to in order to simplify the description of this embodiment.

The active vibration control device provides a vertical air spring 3e, vertical direction supporters B2, which in this embodiment comprise a laminated supporter 7, a pair of horizontal air springs 3a and 3b, a level sensor 9, a vertical acceleration sensor 10, a lateral position sensor 1 and a horizontal acceleration sensor 11.

The vertical air spring 3e and the horizontal air springs 3a and 3b comprise a diaphram section 5 and air tanks 4 which are communicated with the diaphram section 5, respectively. The outer periphery of the diaphram section 5 is bolted to a fixed base 25 connected to the air tank 4 or a partition plate 26 via a fixed seat 24 of ring form and circular seats 24a, 27b, 27c and 27d are fitted in a center movable portion of thereof.

The air tanks 4 for the horizontal air springs 3a and 3b are arranged independently from each other on right and left sides of a center partition plate 26'. In this embodiment, the horizontal air springs 3a and 3b are separated to be a controllable spring and a standard spring and the standard spring 3a is connected to an air pressure source 16 via a precise regulator 19. On the other hand, the controllable air spring 3b is connected to the air pressure source 16 via a control valve 6a and the control valve 6a is controlled by means of an active vibration control circuit.

As is clear from FIG. 9, the horizontal air springs 3a and 3b are enclosed with a casing 30 and the circular seats 27a and 27b are secured to the inside wall of the casing 30. The casing 30 and the vibration control base 2 are connected to each other by means of fine wires 8. The connecting manner of the wires 8 is as follows. As shown in FIG. 9, an arm 29 is projected from each of the outer sides of the casing 30 and the wires 8 arranged to bridge the side walls 2a, are secured to the arms 29. On the other hand, as shown with phantom lines in FIG. 9, the wires 8 projecting from a center portion of the casing 30, may be secured to the sid e wall 2a of each of the vibration control base 2.

The vertical air spring 3e is mounted on the vertical direction supporters B2 which are mounted on the fixed base 25. The vertical direction supporters B2 comprise laminated supporters 7. Each of the laminated supporters 7 comprises a number of a rubber plate 31 and a metal plate 32 which are laminated one another, and it is flexible in horizontal directions, but not compressed almost in vertical directions.

In this embodiment, the vertical direction supporters B2 are arranged to be two stories.

The active vibration control device or means A is used to be positioned at four corners of a base 28, as shown in FIG. 8. The arrangement of the devices are, as shown with arrows in FIG. 8, is such that the horizontal air springs 3a and 3b adjacent to each other are cross in their extending directions.

Next, a horizontal or lateral position maintaining circuit of the horizontal direction control section or means will be described.

Figure 11:
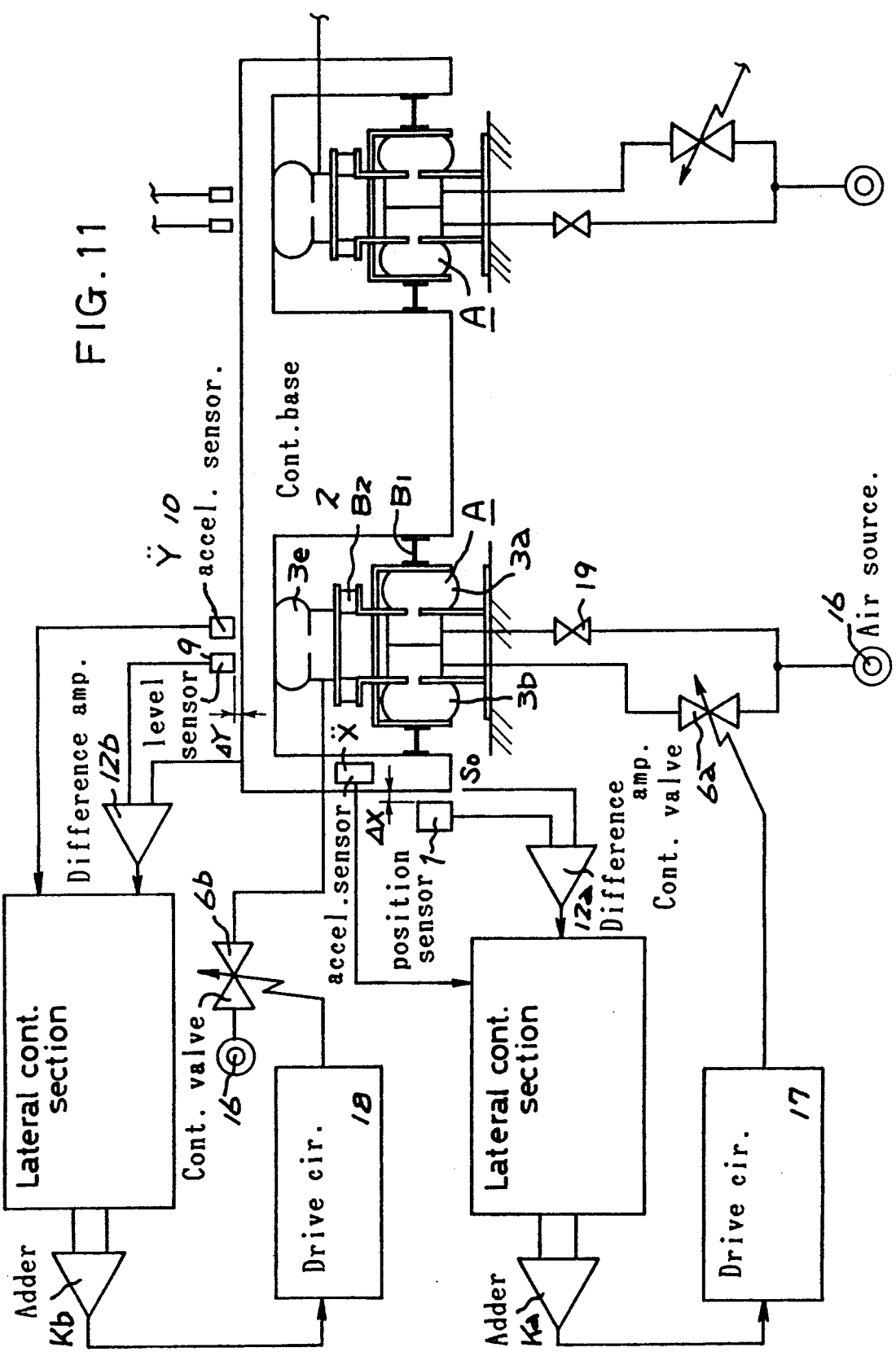
FIG. 11 is a block diagram of the first embodiment for controlling the vibration control base vertically and horizontally.
Figure 12:
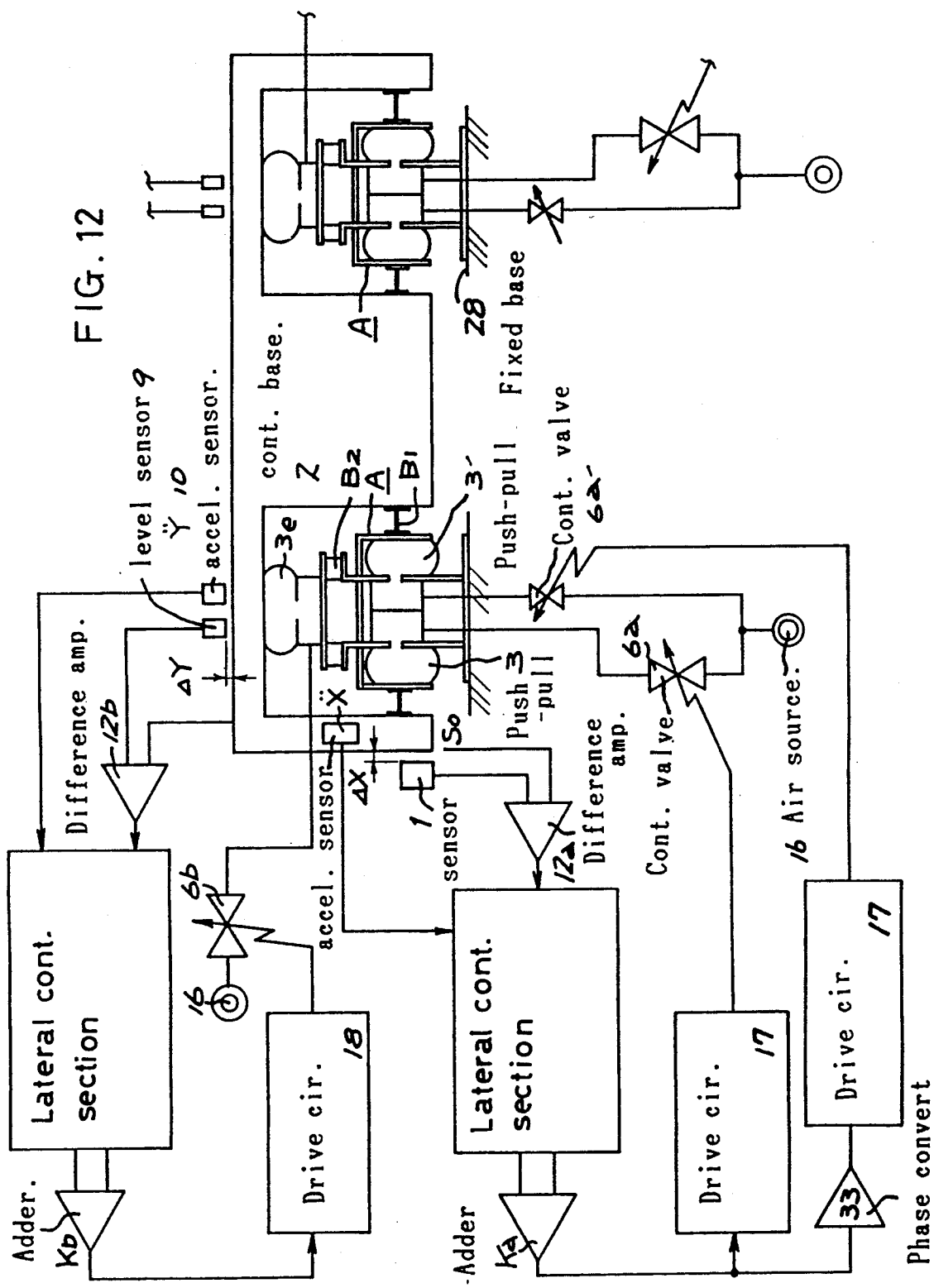
FIG. 12 is a block diagram of the second embodiment of controlling the vibration control base vertically and horizontally by means of a push-pull control.

A lateral position sensor 1 and a horizontal direction acceleration sensor 11 are attached to the arm 29 of the vibration control device A in FIG. 9, which arm is movable in forward and backward, right and left and rotatable together with the vibration control base 2. However, their attachments may be changed to another place. As shown in FIG. 11, the lateral position sensor 1 is so constructed as to detect a displacement of the vibration control base 2 from a standard lateral position So immediately and input a value of the displacement into an input terminal of a lateral position difference amplifier 12a. For instance, a non-contact analog output sensor is used for the lateral position sensor 1.

Figure 2:
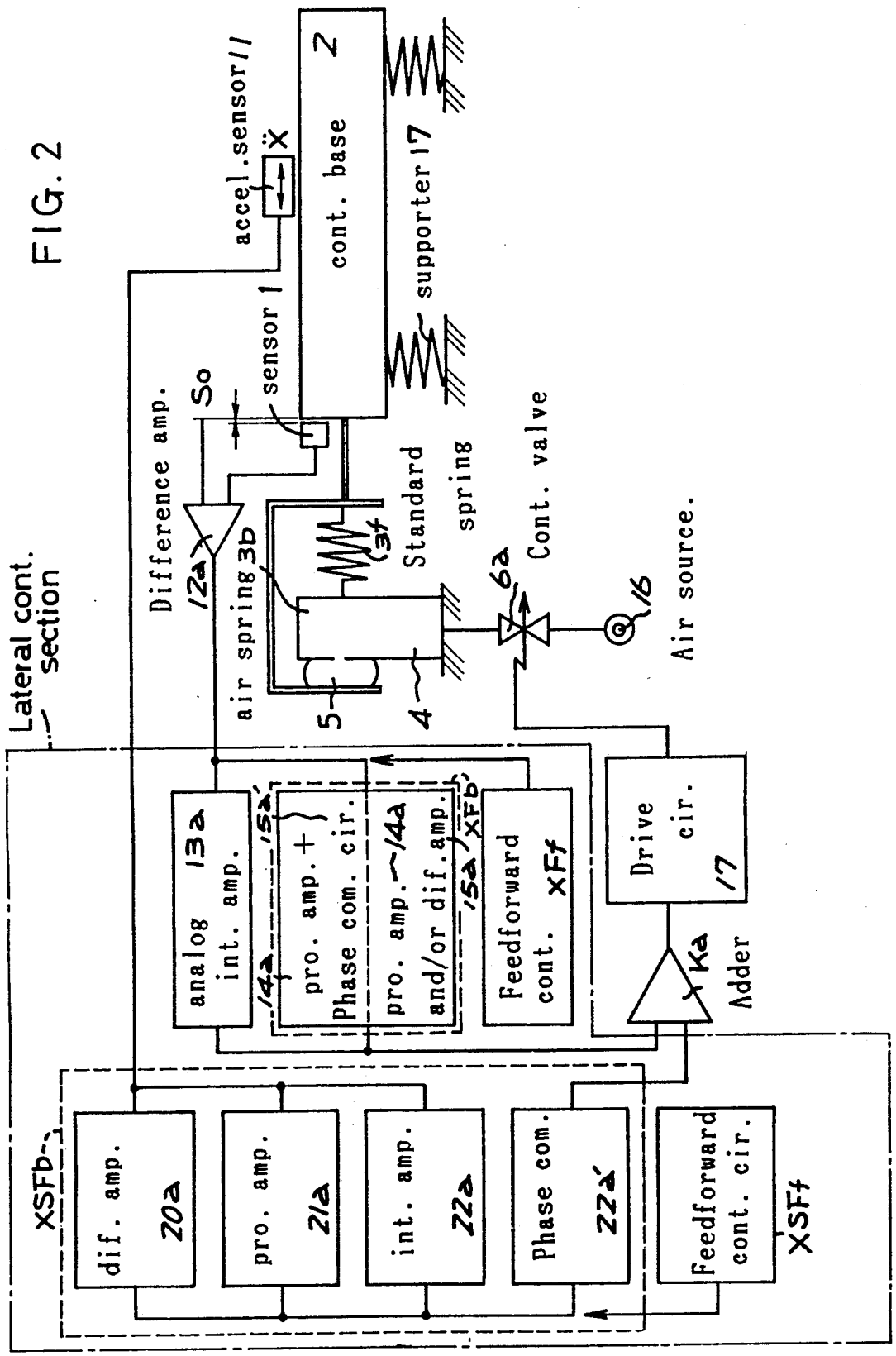
FIG. 2 is a block diagram used for maintaining a standard level and controlling vibrations in horizontal directions.

A lateral standard position voltage corresponding to the lateral standard position So of the vibration control base 2 is input to another input terminal of the lateral position difference amplifier 12a, FIG. 2. Each of output terminals of the lateral position difference amplifier 12a is connected to a lateral position control analog integrating amplifier 13a, a feedback compensation circuit XFb and a feedforward control circuit XFf which is connected to a drive circuit 17 and described in detail hereinafter, and on the basis of an output of the drive circuit 17, the air spring 3b is controlled via an adder Ka. The feedforward compensation circuit XFb means that it comprises a lateral position proportional amplifier 14a and a lateral position differentiating amplifier 15a or the lateral position proportional amplifier 14a and/or a phase compensation circuit 15a', which are refferred to hereinafter.

The feedforward control circuit XFf is constructed to facilitate controlling of vibrations in the beginning of vibration on the basis of predata concerning lateral displacements of the vibration control base 2 by receiving an output of the lateral position control analog integrating amplifier 13a, or the sum of the output and an output of the feedback compensation circuit XFb.

Where only the lateral position control analog integrating amplifier 13a is used, the vibration control base 2 is returned to the standard lateral position So according to a time constant of the integrating amplifier 13a and its returning speed is rather slow. However, where the lateral position control analog integrating amplifier 13a and the feedback compensation circuit XFb are used in combination, its returning speed goes up.

As shown in FIG. 11, the feedback compensation circuit XFb comprises a lateral position proportional amplifier 14a and/or a lateral position differentiating amplifier 15a as a first example, and as a second example, the feedback compensation circuit XFb comprises the lateral position proportional amplifier 14a and a phase compensation circuit 15a'.

As the first example, their combinations are as follows:

(1) The lateral position integrating amplifier 13a and the lateral position proporational amplifier 14a.

(2) The lateral position integrating amplifier 13a and the lateral position differentiating amplifier 15a.

(3) The lateral position integrating amplifier 13a and the lateral position proportional amplifier 14a and the lateral position differentiating amplifier 15a.

As the second example, their combinations are as follows:

(1) The lateral position integrating amplifier 13a and the lateral position proportional amplifier 14a and the phase compensation circuit 15a'.

As mentioned hereinbefore, it becomes possible to speed up positioning and returning of the vibration control base 2 toward a standard or inital position by accelerating a time constant of integration by adding the proportional amplification, the differentiating amplification and the phase compensation other than the analog integration to a relative displacement.

Further, it becomes possible to effectively carry out a relative displacement control by taking a feedback of a differentiated value where the vibration frequencies are higher than a time constant of the air spring 3, for instance, over 0.1 $H_z$. and on the contrary where the vibration frequencies are lower than the time constant, it may take a feedback of a proportional value. According to the feedback controls, it becomes possible to control vibration displacements in low frequencies which are gentle vibrations of the vibration control base 2 in horizontal directions around the standard lateral position So during returning to the standard lateral position. It is very difficult to control such vibration displacements only by taking a feedback of the data obtained by a horizontal direction acceleration sensor 11 which will be referred to hereinafter.

Further, it is limited to reduce an initial response with respect to a disturbance only by using the feedback control for horizontal vibration directions and to improve the disadvantage it is effective to add a feedforward control to the feedback control. The feedforward control circuit XFf will be described in detail below.

The feedforward control circuit XFf may be used in a first manner as follows. Namely, level displacements of the vibration control base 2, which occur due to driving of instruments or apparatus to be controlled, are memorized with for instance a CPU in advance by patterning the lateral displacements. When the lateral displacements occur, it catches initial signals of the lateral displacementds and choose a most preferable pattern immediately and then control a control valve 6a in accordance with the pattern. The second manner is carried out by detecting or measuring an amount of lateral displacement of the vibration control base 2 just before entering control of the vibration control base 2 without memorizing and patterning the lateral displacements and then operating the detected value so as to control the control valve 6a with real time. As the result, it may improve a disadvantage of the feedback control that the lateral position control is not carried out sufficiently in the beginning of vibrations.

The control valve 6a is connected to the air tank 4 of the control air spring 3b and the standard air spring 3a is connected to the air pressure source 16 via the regulator 19. The control valve 6a is controlled with a current like a servo valve so as to regulate an opening angle precisely and then control an air pressure of the air tank 4 of the control air spring 3b.

Next, the analog lateral position integrating amplifier 13a, the lateral position proportional amplifier 14a and the lateral position differentiating amplifier 15a will be described.

The analog lateral position integrating amplifier 13a multifies the output of the lateral position difference amplifier 12a, by $K_1$ and then integrates the result to obtain an analog output ($K_1 \cdot 1/s$) and according to a time constant thereof, controls the control valve 6a by means of a drive circuit 17 to return the vibration control base 2 to its lateral standard position. Namely, the control valve 6a is actuated by means of the drive circuit 17 in such a manner that the output voltage of the lateral position sensor 1 is accorded with the voltage of the lateral standard position so as to make the output of the lateral position difference amplifier 12a zero.

The lateral position proportional amplifier 14a, as mentioned hereinbefore, multiplies the output of the lateral position difference amplifier 12a by $k_2$ so as to speed up rising of returning to the lateral standard position and to control vibrations or swings in horizontal directions due to returning of the vibration control base 2. As the result, the control valve 6a is controlled by means of the drive circuit 17 to precisely accord the multiplies output to the voltage of the lateral standard position.

The lateral position differentiating amplifier 15a multiplies the output of the lateral position difference amplifier 12a by $k_0$ and differentiates the multiplied value ($k_0 \cdot S$) so as to reduce a response to the lateral position displacement by hardening the air spring. Normally, this is effective in controlling the lateral position displacement (swing in horizontal directions) of high frequencies higher than a time constant of the air spring.

The phase compensation circuit 15a' functions as the lateral position differentiating amplifier 15a does.

The feedback compensation circuit XFb comprises the lateral position proportional amplifier 14a and/or the lateral position differentiating amplifier 15a and the lateral position proportional amplifier 14a and functions as filters such as a by-pass filter, a low-pass filter and a notch-filter so as to compensate a phase.

Functions of the feedforward control circuit XFf are as mentioned hereinbefore.

When the vibration control base 2 moves to a plus direction from the standard lateral position So due to working of an instrument on the vibration control base 2 or external forces loaded thereto, the amount of displacement is detected by means of the analog lateral position sensor 1 and output as an analog lateral position voltage. The analog lateral position voltage is input to the lateral position difference amplifier 12a and then compared with a standard lateral position voltage to output a difference of plus voltage as the amount of displacement.

When the standard lateral position voltage becomes higher than the standard lateral position voltage, the difference therebetween is input to the analog lateral position integrating amplifier 13a or the analog lateral position integrating amplifier 13a and the feedback compensation circuit XFb.

Figure 22:
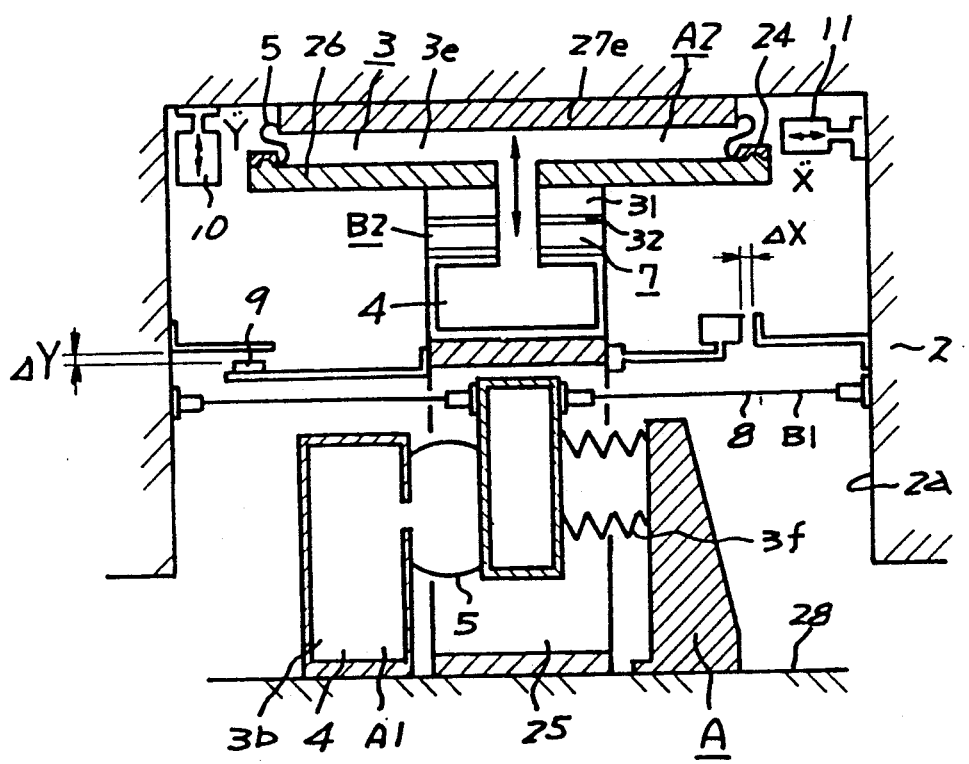
FIG. 22 is a sectional view of the vibration control apparatus of the ninth embodiment.

When the analog lateral position integrating amplifier 13a functions only, the analog integrated value is output and when the analog lateral position integrating amplifier 13a and the feedback compensation circuit XFb function in combination, the sum of the analog integrated value and the feedback compensation value is output and either of the outputs is input to the drive circuit 17 via the adder $K_a$.

Where the feedforward control circuit XFf is added in order to increase a control effect in the begining of vibration, either of the feedforward compensation values as mentioned above, is added to the feedback compensation value or only to the analog integrated value, thereby the control valve 6a is controlled via the drive circuit 17 and the compression air is supplied to the air tanks 4 of the control air spring 3b. As the result, the vibration control base 2 tends to return to the standard lateral position So against the standard pressure of the standard air spring 3a. When the vibration control base 2 starts to return to the standard lateral position So, the output level voltage of the lateral position sensor 1 gradually becomes greater and close to the standard lateral position voltage and at last becomes equal thereto so that the output of the level position difference amplifier 12a becomes zero. Therefore, the vibration control base 2 is maintained stably in the standard lateral position So.

Where a coil spring 3f is used as a standard load as shown in FIGS. 2, 3 and 22, it rapidly responds to the control air spring 3b and increases a control speed.

Where the vibration control base 2 moves from the standard lateral position So in a direction opposite to the plus direction, the output of the lateral position difference amplifier 12a becomes minus. When the vibration control base 2 moves to return to the standard lateral position So and reaches the standard lateral position So, the output of the lateral position difference amplifier 12a becomes zero so that the vibration control base 2 may be fixed at the standard lateral position So without occurring swing or vibration due to functions of the lateral position proportional amplifier 14a.

Next, micro-vibration control of the vibration control base suspended by air springs, will be described below.

In addition to the above mentioned lateral displacement control, micro-vibration control may be given to the vibration control base 2. Namely, as shown in FIG. 11, a horizontal direction acceleration sensor 11 is disposed at a center of the vibration control base 2 for detecting a vibration acceleration in horizontal directions of the vibration control base 2. However, contrary to FIG. 11, the sensor 11 is actually provided with each of the control devices A. To integrate, amplify or differentiate the output of the horizontal direction acceleration sensor 11, at least one of a horizontal direction vibration integrating amplifier 20a, a horizontal direction vibration proportional amplifier 21a and a horizontal direction vibration differentiating amplifier 22a is provided, or a vibration feedback compensation circuit XSFb for a phase compensation is provided in combination.

Next, combination of these amplifiers is as follows.

(1) Only the horizontal direction vibration integrating amplifier 20a functions.

(2) Only the horizontal direction vibration differentiating amplifier 22a functions.

(3) Only the horizontal direction vibration proportional amplifier 21a functions.

(4) The horizontal direction vibration integrating amplifier 20a and the horizontal direction vibration differentiating amplifier 22a function in combination.

(5) The horizontal direction vibration integrating amplifier 20a and the horizontal direction vibration proportional amplifier 21a function in combination.

(6) The horizontal direction vibration differentiating amplifier 22a and the horizontal direction vibration proportional amplifier 21a function in combination.

(7) The horizontal direction vibration integrating amplifier 20a, the horizontal direction vibration differentiating amplifier 22a and the horizontal direction vibration proportional amplifier 21a function in combination.

(8) A phase compensation circuit 22a' is used in combination with the elements as stated in the above item (7).

Each of the outputs of these amplifiers is added by means of the adder $K_a$ and thereafter input to the drive circuit 17 together with the lateral position control output so as to control the control valve 6a to regulate an opening angle thereof and regulate the air pressure of the air tanks 4 of the air spring 3b.

Next, function of each of the amplifiers will be described.

The horizontal direction vibration amplifier 20a functions to multiply an acceleration [X] in horizontal directions by $K_3$ and integrate the result ($K_3 \cdot 1/S$) and output same ($[X] \cdot K_3 \cdot 1/S$).

To carry out a flow rate control by regulating an opening angle of the control valve 6a is to means that the flow rate is integrated. This may be shown by the equation as follows.

$$a/(1+T_a \cdot S) \approx 1/S \qquad (1)$$

There is the relationship of $S > 1/T_a$ in a range of frequency higher than a time constant of the air spring 3b.

When the output ($[X] \cdot K_3 \cdot 1/S$) is input to the drive circuit 17 so as to control the air spring 3b, the output comes to be further integrated and therefore the vibration control base 2 is controlled at its own position regardless of the lateral position of the vibration control base 2. This may be expressed with the following equation.

$$[X] \cdot K_3 \cdot 1/S \cdot 1/S = Y \cdot K_3 \qquad (2)$$

In other words, it functions to control vibrations of the vibration control base 2 by absorbing micro-vibrations propagated from a floor or generated by an instrument on the vibration control base 2. This function substantially corresponds to the function of hardening a spring in the meaning of the characteristics of a metal spring.

The horizontal direction vibration proportional amplifier 21a multiplies an acceleration of the vibration control base 2 by $K_4$ so as to increase an damping effectiveness of vibrations of the air spring 3b.

The horizontal direction vibration differentiating amplifier 22a multiplies an acceleration [X] of the vibration control base 2 by $K_5$ and differentiates the result ($K_5 \cdot S$) and outputs same ($[X] \cdot K_5 \cdot S$), and the output value is input to the drive circuit 17 so as to control the air spring 3b. This function corresponds to increasing of the mass of the vibration control base 2. This may be expressed with the following equation.

$$[X] \cdot K_5 \cdot S \cdot 1/S = [X] \cdot K_5 \qquad (3)$$

By using the above mentioned amplifiers, the micro-vibrations of the vibration control base 2 may be controlled according to the characteristics of each of the amplifiers.

The functions of the vibration control feedback compensation circuit XSFb and the vibration control feedforward compensation circuit XSFf are substantially the same as those of the feedback compensation circuit XFb and the feedforward compensation circuit XFf which are described hereinbefore and so the detailed descriptions thereabout are omitted.

When it is required, a phase compensation circuit 22a', which is effective in vibration control of horizontal direction vibrations, may be connected in series to the differentiating amplifier 22a, the proportional amplifier 21a and the integrating amplifier 20a. The compensation circuit 22a' functions to proceed a phase of an acceleration signal [X] for horizontal directions or delay same so as to carry out intermediate functions of the above mentioned amplifiers 20a, 21a and 22a. Thus, the compensation circuit 22a' is used in combination to control the horizontal vibrations of the vibration control base 2 without resonance which sometimes occurs in simply using the above mentioned amplifiers 20a, 21a and 22a according to certain frequencies of the acceleration signal [X] in horizontal directions.

Figures 5, 6, 7:
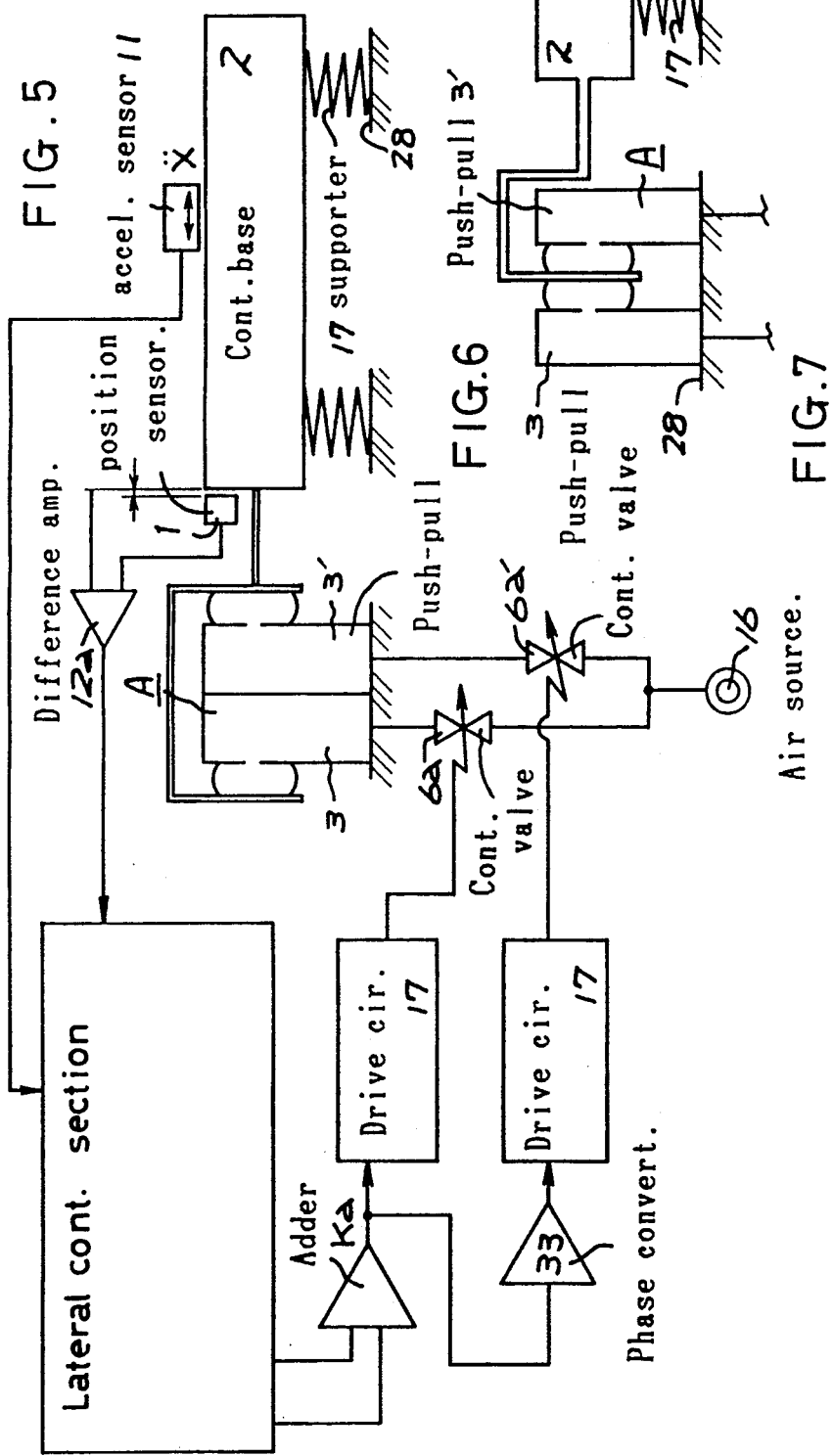
FIG. 5 is a block diagram for a push-pull control in controlling a level.
FIG. 6 is a partial side view of the air springs arranged to be directed in an opposite direction as those of the air springs in FIG. 5.
FIG. 7 is a partial side view showing the air springs in FIG. 5 arranged to be located on both of the sides of vibration control base.

The feedforward control is substantially the same as the case of a level position return control and so functions in two manners. Namely, as the first manner, it controls vibrations of the vibration control base 2 by choosing a vibration control pattern which is preset according to patterns of horizontal vibrations. As the second manner, it controls vibrations of the vibration control base 2 by catching a grade of the vibrations in advance and a control signal is input to the drive circuit 17 in order to control the vibrations. A push-pull system, as shown in FIG. 5, uses a pair of right and left air springs 3 and 3'. These air springs 3 and 3' are controlled in the same directions to each other by means of control signals the phases of which are inverted at 180 degrees to each other, so as to multiply a control force. 33 indicates in inverter and 6a' is a control valve.

Thus, it may carry out returning of the vibration control base 2 to a lateral standard position and controlling of micro-vibrations in horizontal directions at the same time.

Next, level control of the present invention will be described in detailed.

This level control is the same as the lateral position control. The vibration control device or means A provides a level sensor 9 at a portion which moves up and down together with the vibration control base 2, and an output of the level sensor 9 is input to an input terminal of a level difference amplifier 12b. The level sensor 9 comprises a type of non-contact analog output as that of the level position sensor 1. Another input terminal of the level difference amplifier 12b receives a standard level voltage which corresponds to a standard level Ho of the vibration control base 2. The output terminal of the level difference amplifier 12b is connected to a level integrating amplifier 13b, a level proportional amplifier 14b and a level differentiating amplifier 15b' in combination. To increase vibration control in the beginning of vibrations of the vibration control base 2, a feedforward control circuit YFf is provided where it is required.

The combination of the level sensor 9 is the same as the lateral position sensor 1 and therefore its detailed description is omitted here.

The outputs from the above amplifiers are added by means of an adder Kb and input to a control circuit 18 so as to control the control valve 6b. The control valve is connected to the air tanks 4 of the air spring 3e for maintaining the level of the vibration control base 2. The control valve 6b is so constructed as to have an ability of precisely controlling an air pressure in the air tanks 4 of the air spring 3e by regulating its opening angle precisely in accordance with the input current like a servo valve.

Further, the functions of the level integrating amplifier 13b, the level proportional amplifier 14b, the level differentiating amplifier 15b or the phase compensation circuit 15' are the same as in the level position control. It may be provided with the feedforward control circuit YFf when it is required, and the construction of the circuit is as shown in FIG. 11 and accordingly its detailed description is omitted here.

Next, level maintaining function will be described below.

When a load acts on the vibration control base 2 and the vibration control base 2 goes down or when the vibration control base 2 is unloaded to go up or when the vibration control base 2 is inclined or tilted due to movement of a load acting thereon, the level sensor 9 detects and amount of displacement ΔY in vertical directions relative to the standard level Ho and then outputs a level voltage to be input to the level difference amplifier 12b. The output difference is compared with the standard level voltage. Where the vibration control base 2 is descending below the standard level Ho, the standard level voltage becomes higher than the level voltage and the output of the level difference amplifier becomes plus and the plus difference is input to the level integrating amplifier 13b.

Where the analog level integrating amplifier 13b is used only, the analog integrated value is output and where the analog level integrating amplifier 13b and the feedback compensation circuit VFb are used in combination, both of the outputs are added and the sum is output and either of the outputs is input to the drive circuit 18. Further, to increase a vibration effect in the beginning of vibrations of the vibration control base 2, the feedforward control circuit YFf is further provided and the feedforward control value is added to the feedback compensation value. As the result, the control value 6b is controlled by means of the drive circuit 18 and an compression air is supplied to the air tank 4 of the air spring 3e so as to lift up the vibration control base 2.

The vibration control base 2 starts to go up, the output voltage of the level sensor 10 becomes gradually high and close to the standard level voltage and at last equal thereto so that the output of the level difference amplifier 12b becomes zero. At the moment the input value to the drive circuit 18 becomes stable and the vibration control base 2 is stably maintained at the standard level Ho. Where the vibration control base 2 is lifted above the standard level Ho, the output of the level difference amplifier 12b becomes minus reversely. As mentioned above, when the vibration control base goes down and reaches the standard level Ho, the output of the level difference amplifier 12b becomes zero so that the vibration control base 2 may be fixed at the standard level by means of functions of the level proportional amplifier 14b and so forth without swings or vibrations.

Next, vibration control of a vibration control base suspended by air springs against micro-vibrations in vertical directions, will be described in detail.

A vertical acceleration sensor 10 is provided with a portion which is vibrated together with the vibration control base 2 in order to detect a vibration acceleration [Y] in vertical directions of the vibration control base 2. One of a vertical direction vibration integrating amplifier 20b for integrating the output [Y] of the vertical acceleration sensor 10 and multiplied same by $K_9$, a vertical direction differentiating amplifier 22b for differentiating the output [Y] and a vertical direction vibration proportional amplifier 21b is provided solely or in combination, and a vibration control feedback compensation circuit YSFb including a phase compensation is also provided in combination thereto. A phase compensation circuit 22b' for vertical directions is the same as the horizontal direction vibration control and therefore its detailed description is omitted here.

Further, a manner of combination of these amplifiers is the same as the lateral position control and therefore its detailed description is also omitted here. The outputs from the above mentioned amplifiers are input to the level drive circuit together with the level control signals so as to control an opening angle of the control valve 6b and regulate an air pressure of the air tank 4 of the air spring 3e.

Each of the amplifiers and other functions are omitted here since they are the same as the case of the level position control. Further, an output of a feedback control circuit YSFf for vibration control is added to the outputs of the amplifiers according to its requirement.

Figure 13:
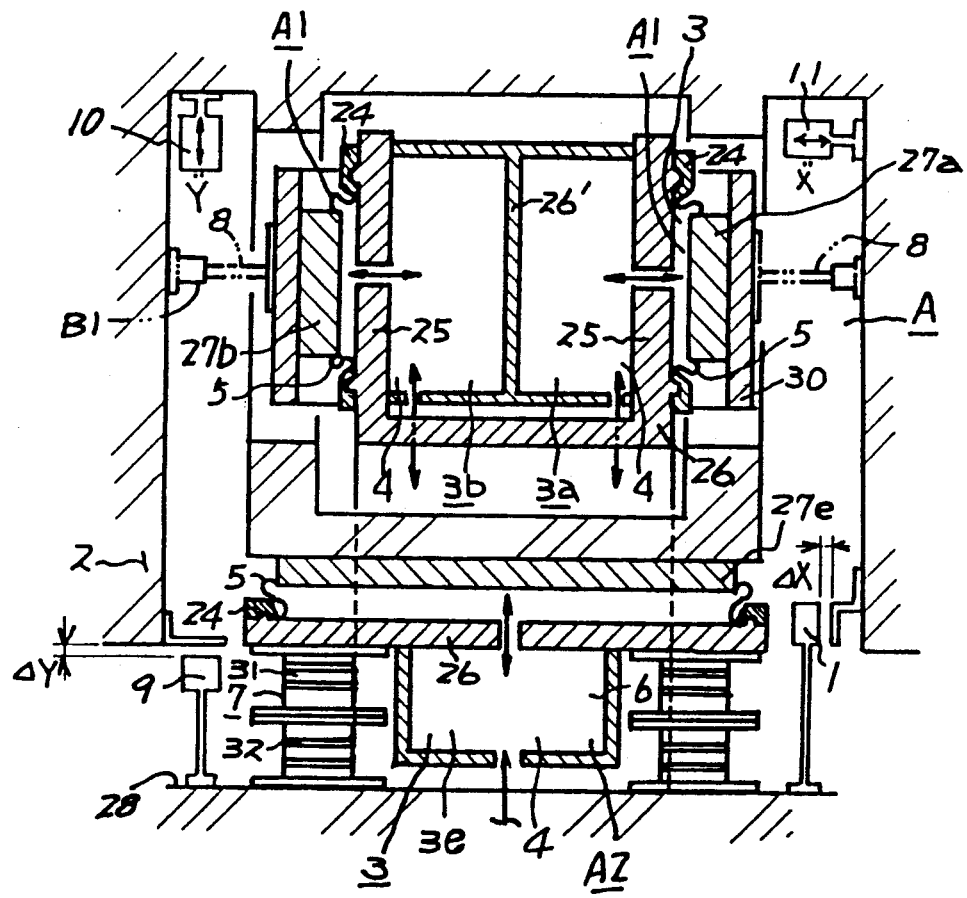
FIG. 13 is a sectional view of the vibration control apparatus of the second embodiment.

Further, in the case of FIG. 13, the air springs 3a and 3b (3,3') for horizontal directions and the air spring 3e are arranged reversely in the case of FIG. 3 and a partition wall of the air springs 3a and 3b (3,3') for horizontal directions is bridging the air spring 3e for vertical directions.

Figure 14:
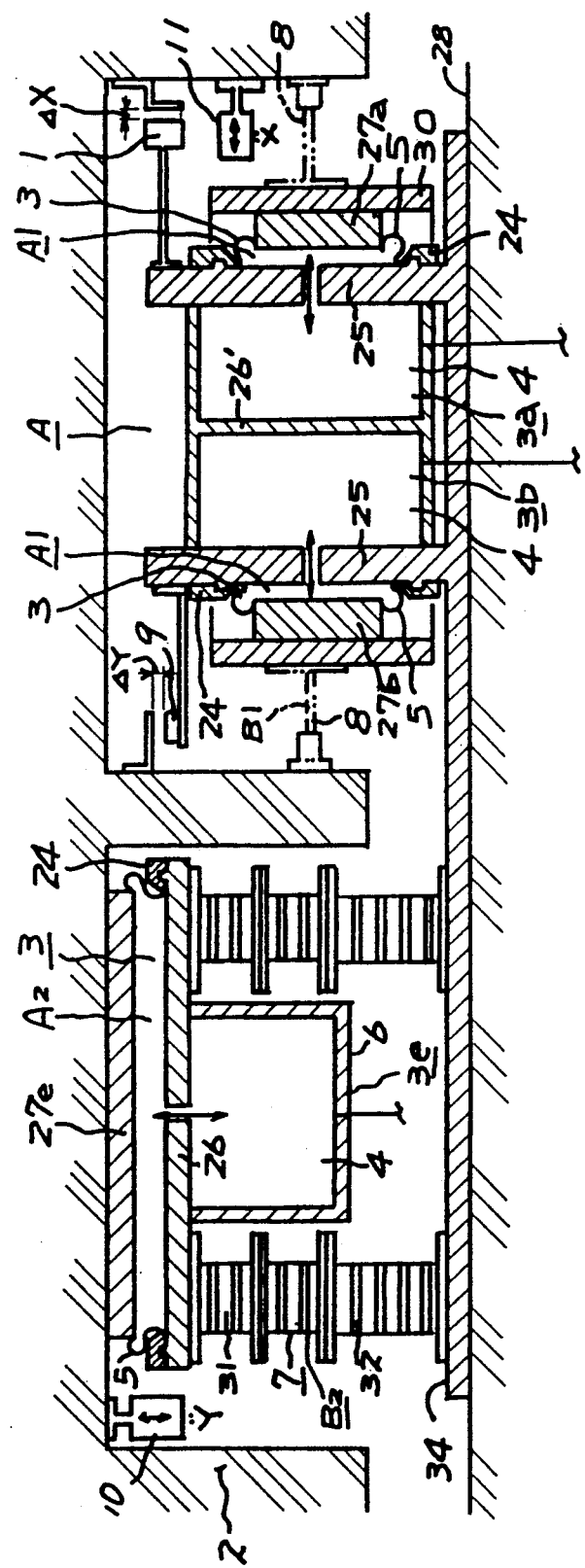
FIG. 14 is a sectional view of the vibration control apparatus of the third embodiment.

In the case of FIG. 14, the air springs 3a and 3b (3,3') for horizontal and the air spring 3e are aligned on a common base 28.

FIGS. 15 and 16 show a case of three axes control in vertical direction and two horizontal directions.

Figure 17:
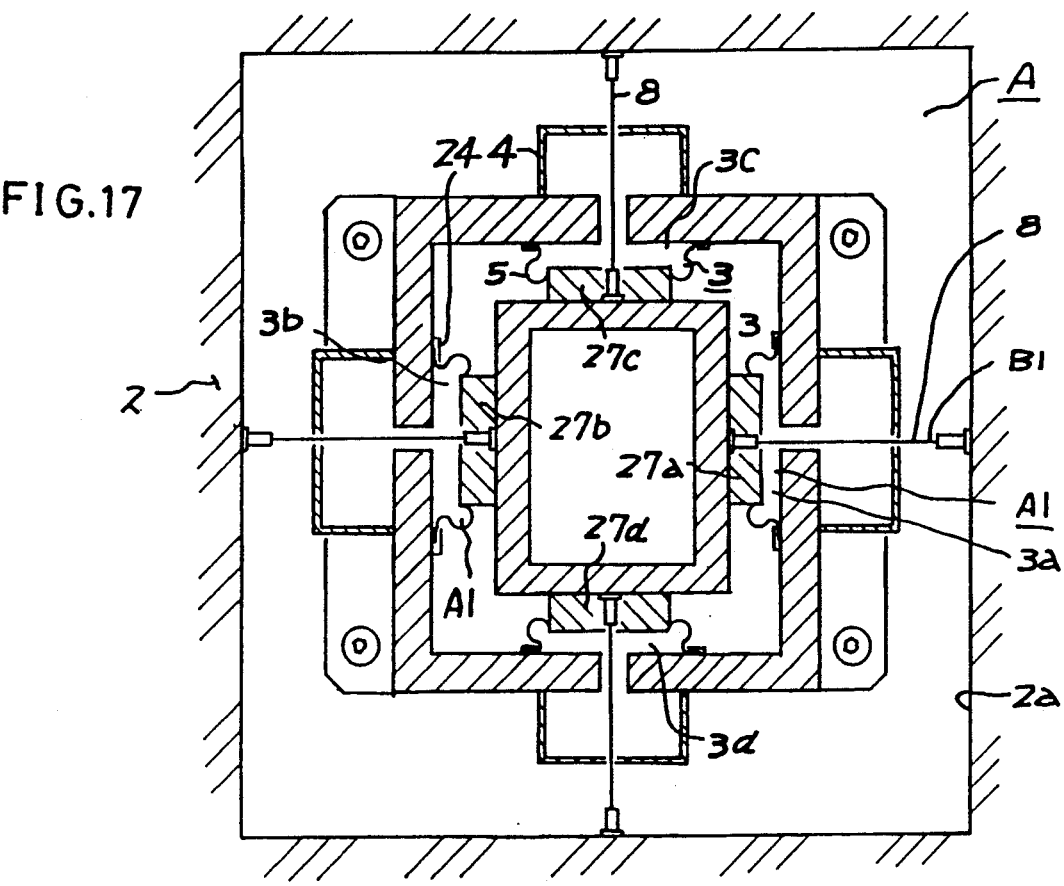
FIG. 17 is a cross sectional view of the vibration control apparatus of the fifth embodiment.
Figure 18:
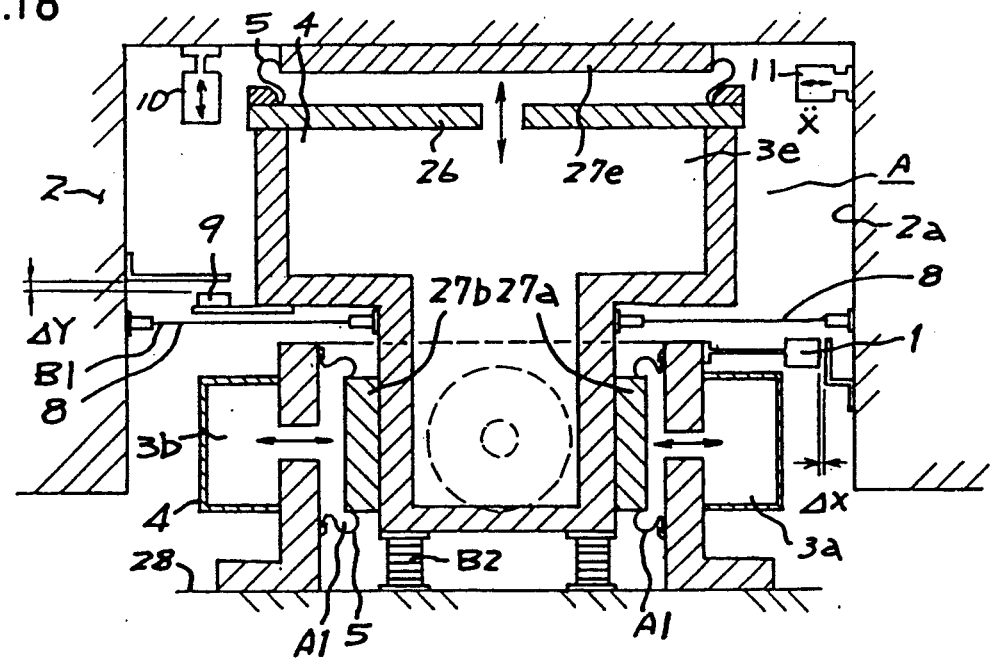
FIG. 18 is a sectional side view of the apparatus in FIG. 17.

FIGS. 17 and 18 show a case of substantially the same three axes control, but the air springs 3a to 3d are attached reversely in the case of FIGS. 15 and 16.

Figure 19:
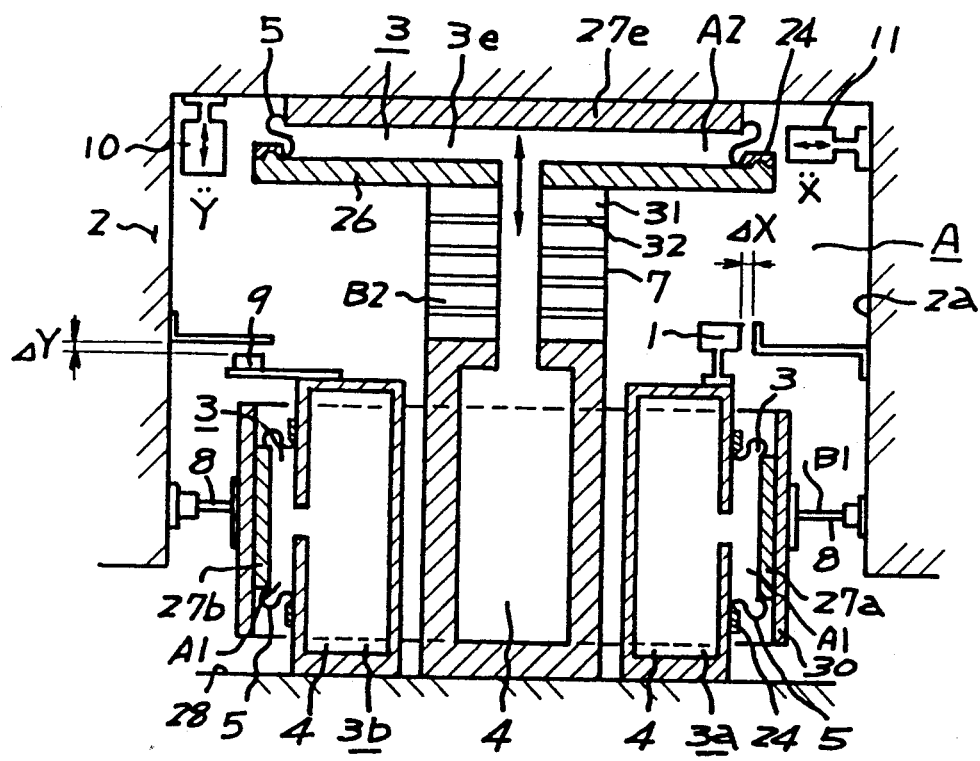
FIG. 19 is a cross sectional view of the vibration control apparatus of the sixth embodiment.

FIG. 19 shows a case of separating and independing the air spring 3a from the case of FIG. 16 and a fixed base 25 is directly set on a base 28. The air tank 4 fo the air spring 3e and a rubber spring 5 are communicated to each other through a vertical direction supporter B2, or by means of a manner of by-pass.

Figure 20:
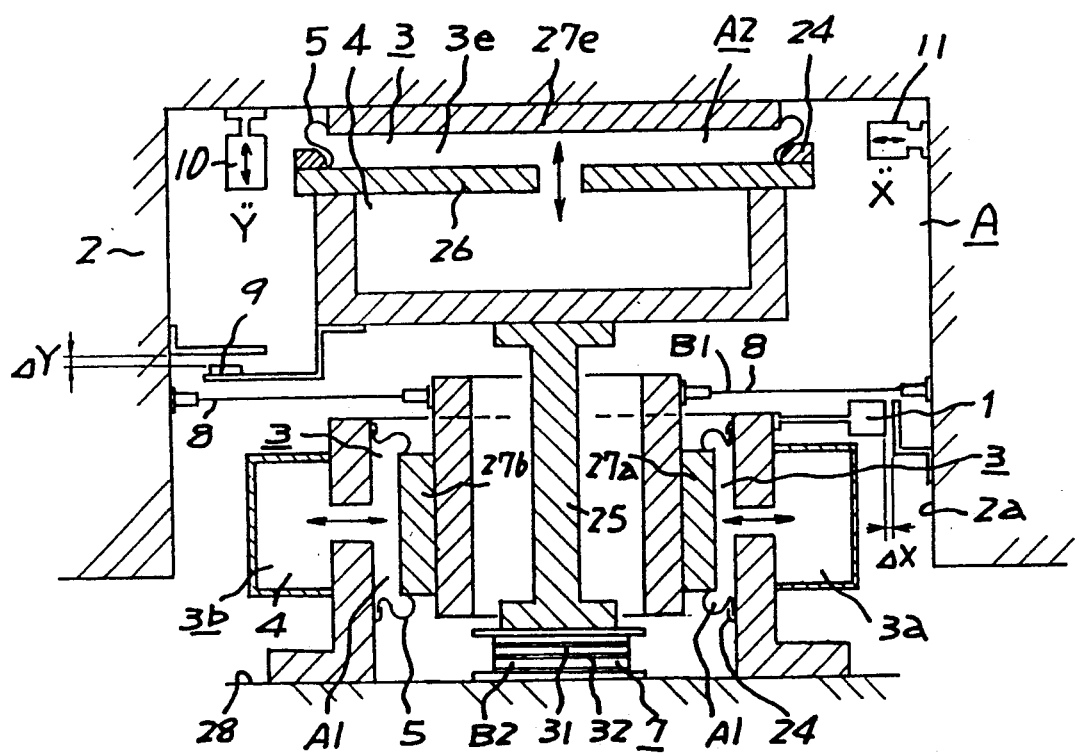
FIG. 20 is a sectional view of the vibration control apparatus of the seventh embodiment.
Figure 21:
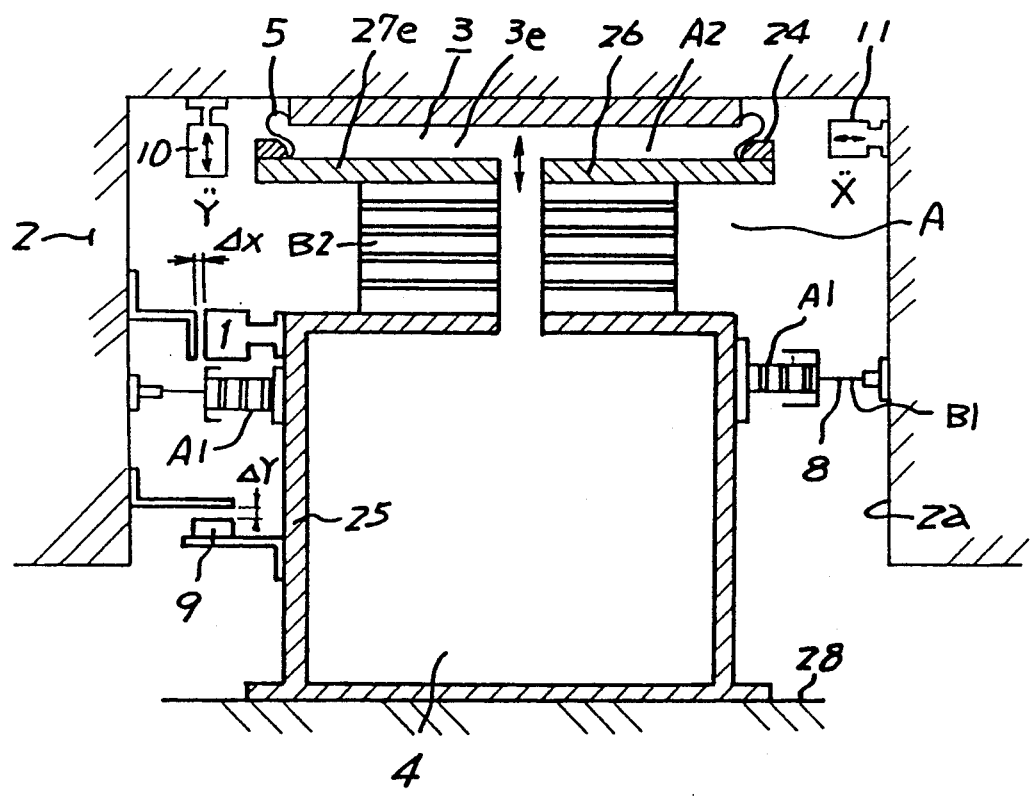
FIG. 21 is a sectional view of the vibration control apparatus of the eighth embodiment.

FIG. 20 shows a case wherein the fixed base 25 stands on the vertical direction supporter B2 and is controlled by the air spring 3e from the outside.

FIG. 22 shows an example wherein piezo electron crystals 3ap and 3bp are used for level control.

Figure 23:
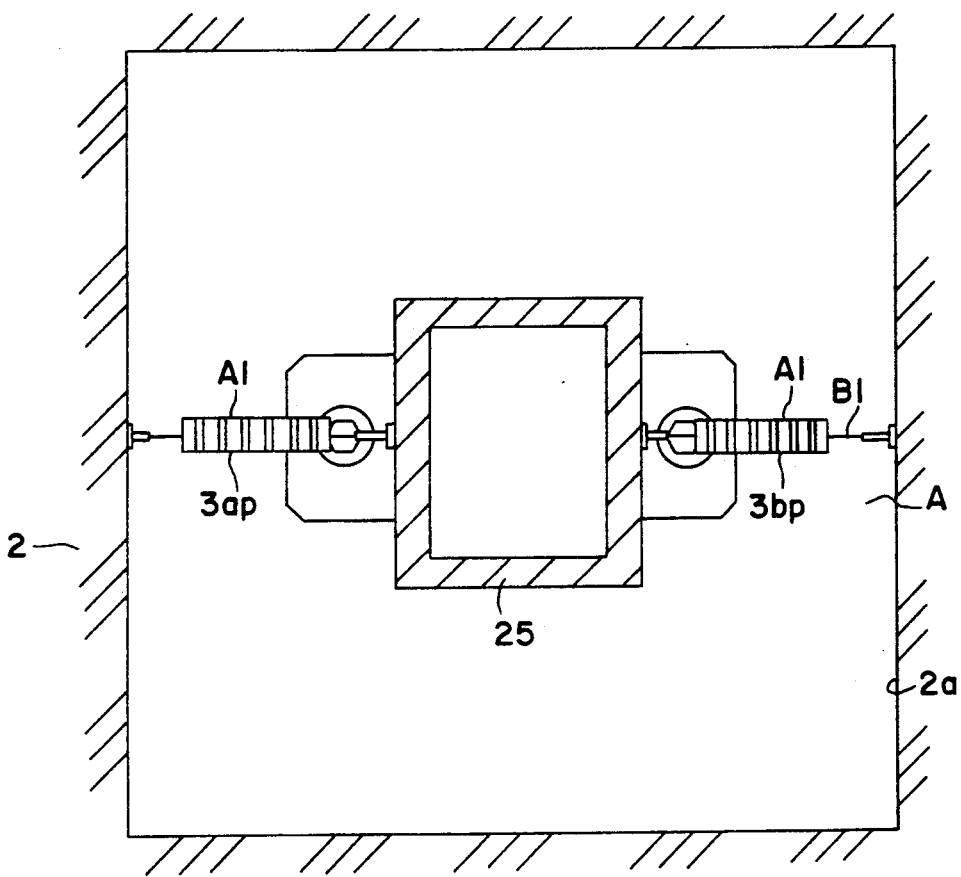
FIG. 23 is a cross sectional view of the vibration control apparatus of the tenth embodiment.
Figure 24:
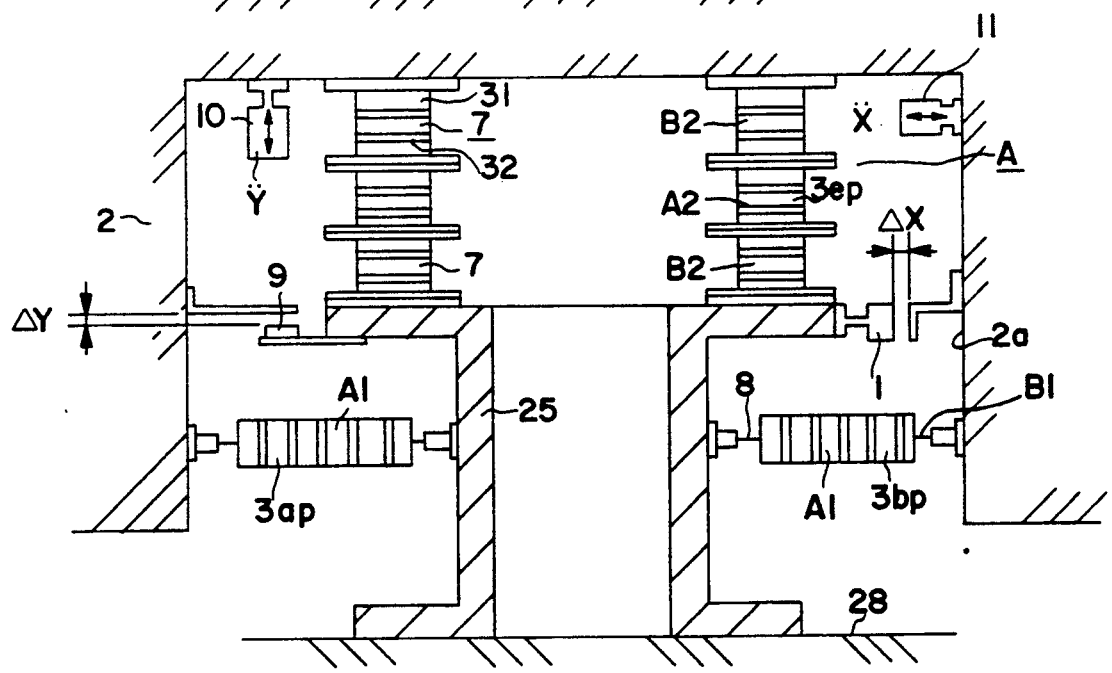
FIG. 24 is a sectional side view of the vibration control apparatus of the tenth embodiment.

FIGS. 23 and 24 also show an example wherein piezo electron crystals 3ap. 3bp . . . 3ep are used for horizontal and vertical direction controls.

Figure 25:
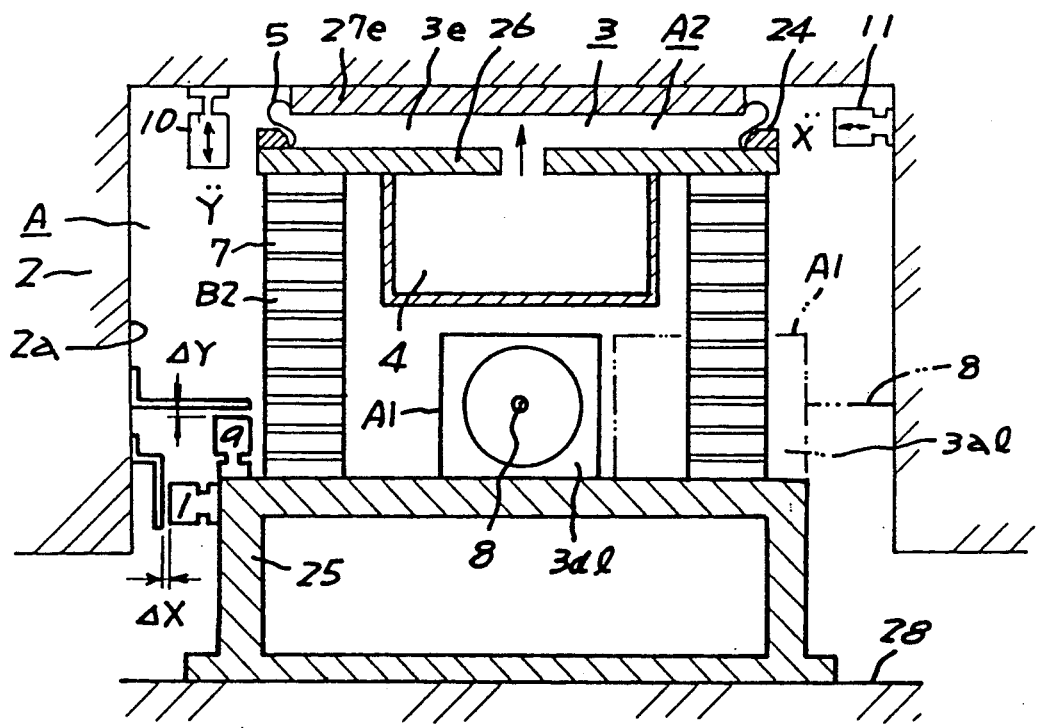
FIG. 25 is a cross sectional view of the vibration control apparatus of the eleventh embodiment.
Figure 26:
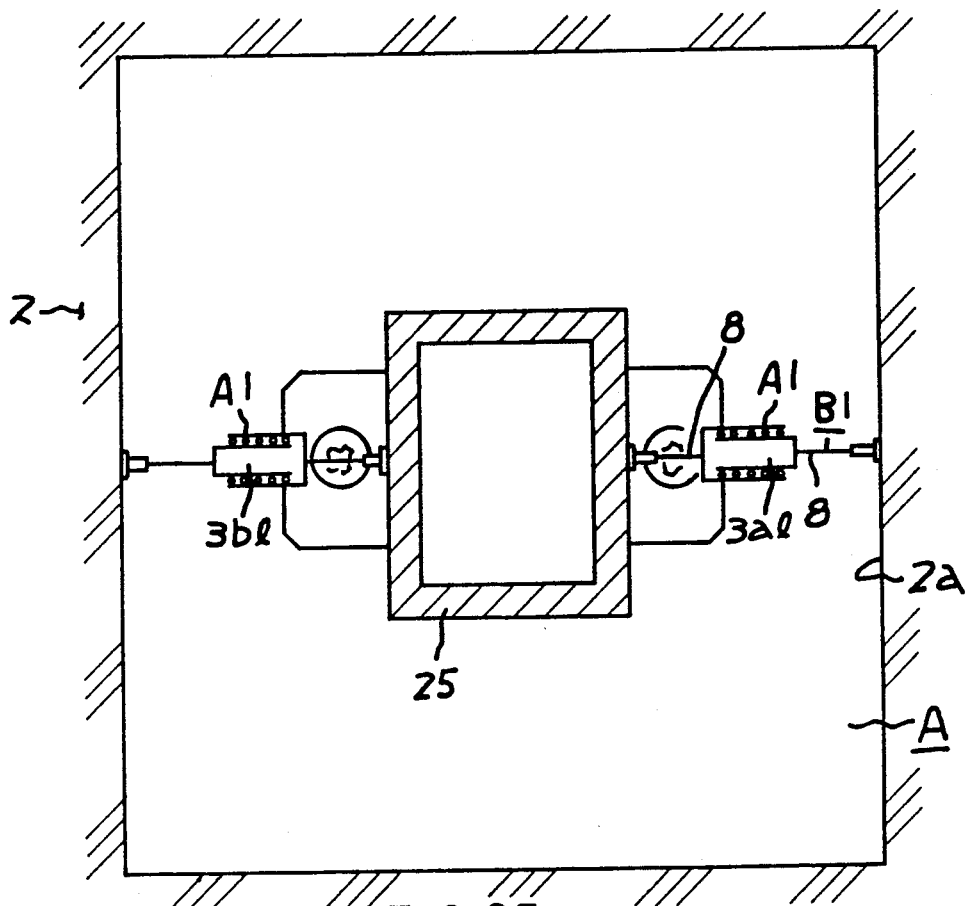
FIG. 26 is a sectional side view of the vibration control apparatus of the eleventh embodiment.

FIGS. 25 and 26 an example wherein lenear motors 3al is used for horizontal direction and the epizo electron 3ap is used for vertical directions.

Figure 27:
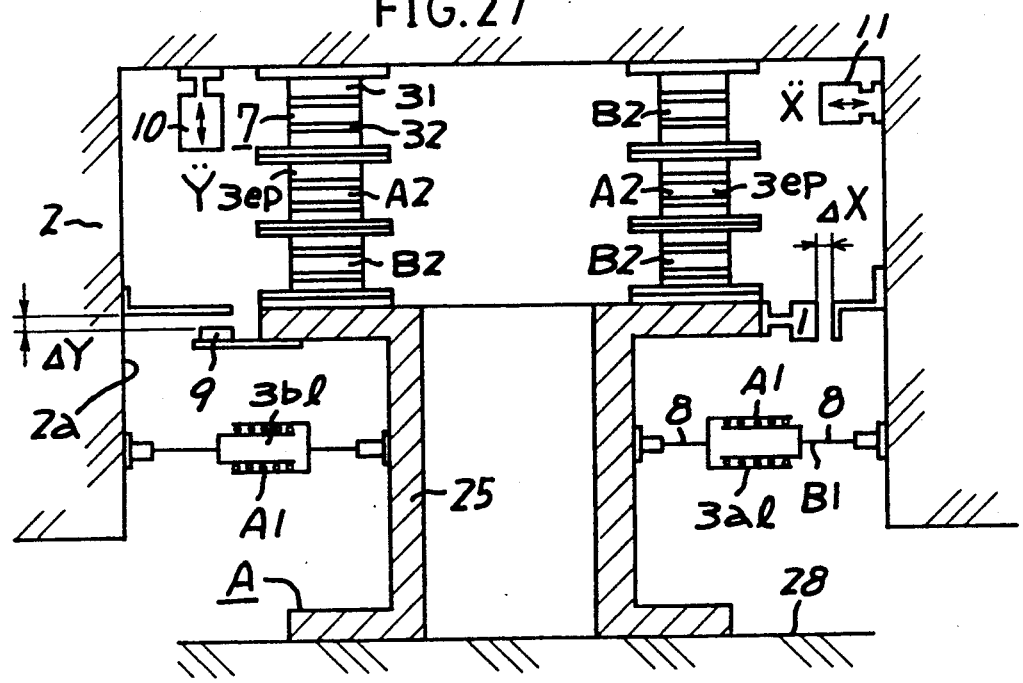
FIG. 27 is a sectional side view of the vibration control apparatus of the twelfth embodiment.
Figure 28:
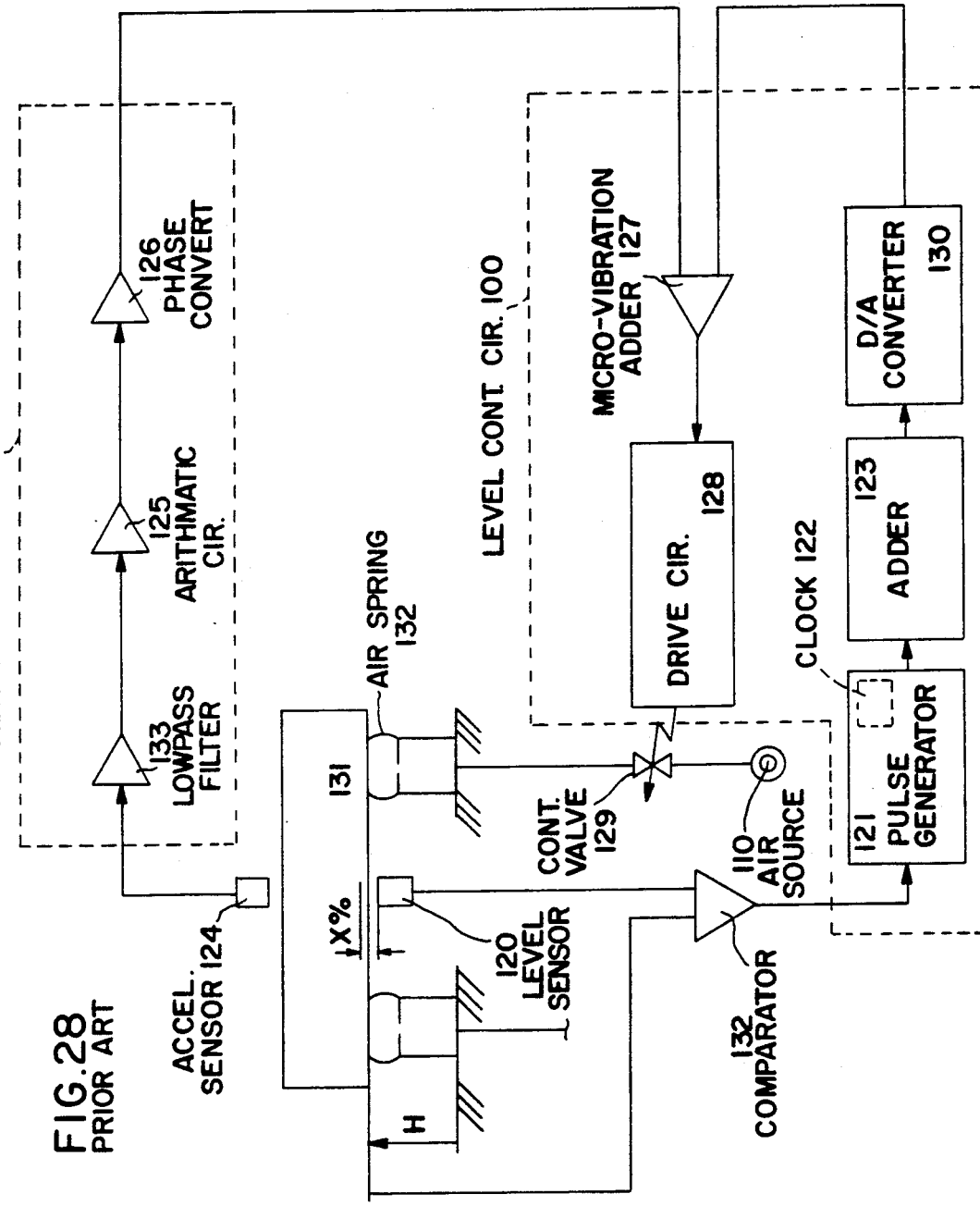
FIG. 28 is a block diagram used for a conventional digital control.

FIG. 27 show an example wherein an air spring 3e is used for vertical control and linear motors 3al are used for control in horizontal directions.

Figure 1:
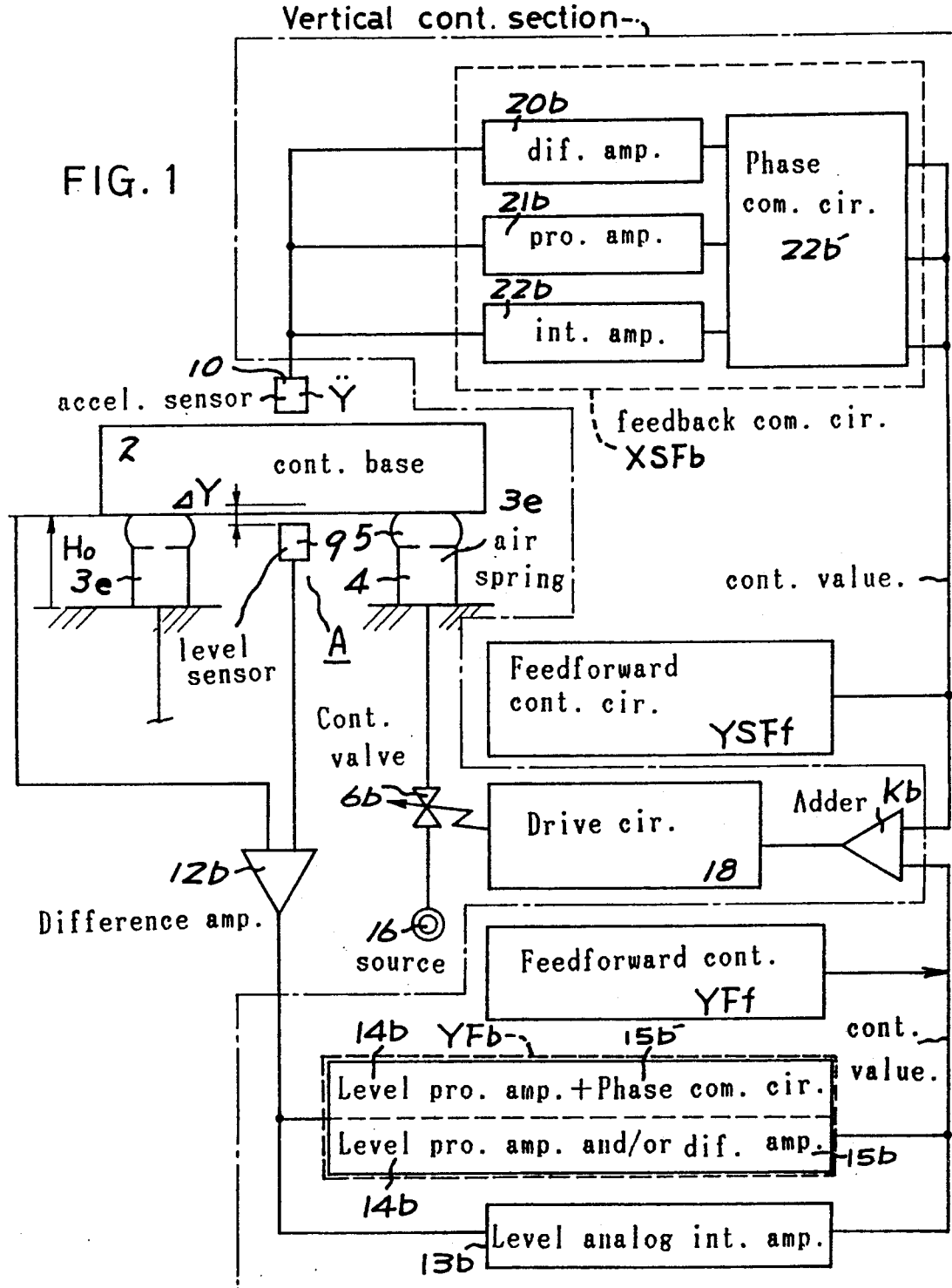
FIG. 1 is a block diagram used for maintaining a level and removing micro-vibrations.

Further, FIGS. 8 through 11 refer to an apparatus actually used for controlling vertical ad horizontal directions. However, it may be constructed to control only a level maintaining control or a level maintaining control and a vibration control for vertical directions as shown in FIG. 1 and further it is modified to be able to control only a level position and vibrations in horizontal directions, as shown in FIGS. 2 through 7.

What is claimed is:

1. A method of controlling the level and vibrations of a vibration control base suspended by air springs comprising the steps of:
   sensing the level of the vibration control base suspended by air springs to output a level voltage,
   comparing the level voltage with a standard level voltage to obtain and output a difference therebetween,
   integrating the difference to obtain an analog integrated value only or integrating the difference and giving a feedback compensation to the difference at the same time to obtain a compensated value for accelerating levelling of the vibration control base,
   outputting the analog integrated value only or a value obtained by adding the analog integrated value and the compensated value as a level control value,
   sensing an acceleration of vibration of a vibration control base in vertical directions to output a vertical acceleration voltage, and
   controlling an air pressure of the air springs in accordance with the level control value and the vertical acceleration voltage.

2. The method as claimed in claim 1 wherein:
   the level control value is obtained by adding a feedforward control value for a vertical displacement obtained on the basis of predata of the vertical displacement to the feedback compensation value and the analog integrated value.

3. The method as claimed in claim 2, further comprising the steps of:
   sensing an acceleration of vibration of a vibration control base in vertical directions to output a vertical acceleration voltage,
   giving at least one of integration, differentiation and amplification to the vertical acceleration voltage or in addition thereto a phase compensation, so as to carry out a vertical vibration feedback compensation, and
   controlling an air pressure of the air springs in accordance with a level and vibration control value obtained by summing a vertical vibration control value obtained by the vertical vibration feedback compensation and the level control value.

4. The method as claimed in claim 3 wherein: the level and vibration control value is obtained by adding a feedforward control value for vertical vibrations obtained on the basis of the predata to a vertical vibration control value obtained by the vertical vibration feedback compensation.

5. The method as claimed in claim 1 further comprising the steps of:
   giving at least one of integration, differentiation and amplification to the vertical acceleration voltage or in addition thereto a phase compensation, so as to carry out a vertical vibration feedback compensation, and
   controlling an air pressure of the air springs in accordance with a level and vibration control value obtained by summing a vertical vibration control value obtained by the vertical vibration feedback compensation and the level control value.

6. The method as claimed in claim 5 wherein:
   the level and vibration control value is obtained by adding a feedforward control value for vertical vibrations obtained on the basis of predata to a vertical vibration control value obtained by the vertical vibration feedback compensation.

7. A method of maintaining a lateral position of a vibration control base suspended by air springs and controlling vibrations of the vibration control base in horizontal directions comprising the steps of:
   sensing a displacement of the vibration control base in horizontal directions with respect to a standard lateral position thereof to output an analog lateral position voltage,
   comparing the analog lateral position voltage with a standard lateral position voltage to obtain a difference therebetween,
   giving analog integration or feedback compensation for accelerating lateral positioning of the vibration control base in combination with the analog integration to the difference so as to output a lateral position control value to carry out a lateral position control,
   sensing an acceleration of vibration of the vibration control base in horizontal directions to out put a lateral acceleration voltage,
   giving at least one of integration, differentiation and amplification to the lateral acceleration voltage or giving thereto a lateral vibration control feedback compensation including a phase compensation to output a lateral vibration control value and carry out lateral vibration control of the vibration control base, and
   controlling an air pressure of air springs in accordance with a lateral position and lateral vibration control value obtained by summing the lateral position control value and the lateral vibration control value.

8. A method of controlling a lateral vibration of a vibration control base suspended by a pair of air springs which are extendable in opposite lateral directions to one another comprising the steps of:*
   sensing a displacement of the vibration control base in horizontal directions with respect to a standard lateral position thereof to output an analog lateral position voltage,
   comparing the analog lateral position voltage with a standard lateral position voltage to obtain a difference therebetween, giving analog integration or feedback compensation for accelerating lateral positioning of the vibration control base in combination with the analog integration to the difference so as to output a lateral posiiton control value to carry out a lateral position control, sensing an acceleration of vibration of the vibraiton control base in horizontal directions to out put a lateral acceleration voltage, giving at least one of integration, differentiation and amplification to the lateral acceleration voltage or giving thereto a lateral vibration control feedback compensation including a phase compensation to output a lateral vibration control value and carry out a lateral vibration control of the vibration control base, controlling an air pressure of one of the air springs in accordance with a lateral position and lateral vibration control value obtained by summing the lateral position control value and the lateral vibration control value, and controlling an air pressure of another air spring in accordance with a value obtained by converting its phase at 180° relative to the lateral position and lateral vibrating control value.

9. The method as claimed in claim 8 further comprising the step of:

obtaining a feedforward control value for horizontal directions on the basis of predata for horizontal directions, wherein the lateral vibration control value is obtained by adding the feedforward control value to the feedback control value obtained by the feedback compensation in horizontal directions.

10. An active vibration control apparatus comnprising:

a fixed base, a vibration control base disposed above the fixed base, vertical supporters interposed between the fixed base and the vibration control base to support the vibration control base and having flexibility in horizontal directions, a vertical acceleration sensor for sensing vertical vibration accelerations of said vibration control base, a level sensor for sensing the level of the vibration control base and outputting a level voltage, a lateral position sensor for detecting the displacement of said vibration control base from a standard lateral position, vertical direction vibration control means comprising air springs interposed between the fixed base and the vibration control base via vertical supporters, vertical direction control means for using outputs from said level sensor and from said vertical acceleration sensor to drive the vertical direction vibration control means for returning to and maintaining the level of the vibration control base at a standard level position and for controlling vertical vibrations of said vibration control base, horizontal direction vibration control means comprising air springs interposed between the fixed base and the vibration control base, and horizontal direction control means to drive the horizontal direction vibration control means for returning to and maintaining the lateral position of the vibration control base at a standard lateral position and for controlling horizontal vibrations of said vibration control base.

11. The apparatus as claimed in claim 10 further comprising;

lateral supporters flexible in any direction except axial directions thereof, wherein the lateral vibration control means is disposed between the fixed base and the vibration control base via the lateral supporters.

12. The apparatus as claimed in claim 11 wherein:

the vertical and lateral supporters comprise a plurality of rubber plates and metal plates which are laminated to one another.

13. The apparatus as claimed in claim 11 wherein: the lateral supporters comprise wires.

14. The apparatus as claimed in claim 10 wherein:

the vertical direction control means comprises a level maintaining circuit, and a control valve for the air springs, said level maintaining circuit including a level difference amplifier for comparing the level voltage with the standard level voltage and outputting a difference therebetween, an analog integrating amplifier for integrating the level difference from the level difference amplifier or a feedback compensation circuit for accelerating levelling of the vibration control base in combination with the analog integrating amplifier, thereby controlling the control valve for the air springs for vertical directions in accordance with the output of the analog integration amplifier and/or the level control value obtained by summing the output of the analog integrating amplifier and the output of the feedback compensation circuit.

15. The apparatus as claimed in claim 14 further comprising;

a feedforward control circuit for carrying out feedforward control on the basis of predata for a level displacement of the vibration control base, wherein the level control value is obtained by adding a feedforward control value obtained by the feedforward control circuit to the feedback compensation value of level displacement and the analog integrated value.

16. The apparatus as claimed in claim 10 further comprising:

the vertical direction control means comprises a vertical vibration control feedback circuit, and a control valve for the air springs, said vertical vibration control feedback circuit including at least one of a vertical vibration integrating amplifier for integrating an output of the vertical acceleration sensor, a vertical vibration differentiating amplifier for differentiating the output of the vertical acceleration sensor, and a vertical vibration proportional amplifier for amplifying the output of the vertical acceleration sensor or a phase compensation circuit, so as to obtain a vertical vibration control value therefrom, wherein the control valve for the air springs is controlled in accordance with the sum of the vertical vibration control value and the level control value.

17. The apparatus as claimed in claim 16 further comprising;

a feedforward control circuit for carrying out feedforward control on the basis of predata for vertical vibrations of the vibration control base, wherein the vertical vibration control value is obtained by adding the feedforward control value to the feedback compensation value, so as to control the control valve for the air springs in accordance with the sum of the vertical vibration control value and the level control value.

18. The apparatus as claimed in claim 10 wherein:
the horizontal direction control means includes:
lateral air springs for generating a horizontal standard load for loading substantially a constant lateral load onto the vibration control base or a connecting member connected thereto and for generating a control load for loading same onto the vibration control base or a connecting member connected thereto in an opposite direction to the horizontal standard load,
an analog level position sensor for sensing a level displacement of the vibration control base from a standard level position thereof and outputting an analog level position voltage,
a level difference amplifier for comparing the analog level position voltage with a standard level position voltage and for outputting a difference therebetween,
an integrating amplifier for integrating the difference or the integrating amplifier and a feedback compensation circuit for accelerating levelling of the vibration control base, so as to obtain a lateral position control value,
at least one of an analog horizontal acceleration sensor for sensing an acceleration of horizontal vibrations of the vibration control base, a horizontal vibration integrating amplifier for integrating an output of the analog horizontal acceleration sensor, a horizontal vibration differentiating amplifier for differentiating the output of the analog horizontal acceleration sensor, a horizontal vibration proportional amplifier for amplifying the output of the analog horizontal acceleration sensor or a vibration feedback compensation circuit for a phase compensation, so as to obtain a horizontal vibration control value,
an adder for adding the horizontal vibration control value to the lateral position control value, and
a control valve for controlling an air pressure of the lateral air springs in accordance with a value output from the adder.

19. The apparatus as claimed in claim 10 wherein
the horizontal direction control means includes:
lateral air springs for generating a horizontal force and for loading same onto the vibration control base or a connecting member connected thereto in an opposite direction to one another,
an analog level position sensor for sensing a level displacement of the vibration control base from a standard level position thereof and outputting an analog level position voltage,
a level difference amplifier for comparing the analog level position voltage with a standard level position voltage and for outputting a difference therebetween,
an integrating amplifier for integrating the difference or the integration amplifier and a feedback compensation circuit for accelerating levelling of the vibration control base, so as to obtain a lateral position control value,
at least one of an analog horizontal acceleration sensor for sensing an acceleration of horizontal vibrations of the vibration control base, a horizontal vibration integrating amplifier for integrating an output of the analog horizontal acceleration sensor, a horizontal vibration differentiating amplifier for differentiating the output of the analog horizontal acceleration sensor, a horizontal vibration proportion amplifier for amplifying the output of the analog horizontal acceleration sensor or a vibration feedback compensation circuit for a phase compensation, so as to obtain a horizontal vibration control value,
an adder for adding the horizontal vibration control value to the lateral position control value,
a control valve for controlling an air pressure of the lateral air springs in accordance with a value output from the adder, and
a phase converting circuit for converting a phase of the value output from the adder at 180°, thereby the air pressure of the air springs is controlled in response to an output from the phase converting circuit.

* * * * *